United States Patent
Park et al.

(10) Patent No.: US 10,516,552 B2
(45) Date of Patent: Dec. 24, 2019

(54) ELECTRONIC DEVICE AND METHOD FOR SETTING COMMUNICATION PROTOCOL

(71) Applicant: Samsung Electronics Co., Ltd., Suwon-si, Gyeonggi-do (KR)

(72) Inventors: Sung Jin Park, Seoul (KR); Hyung Yeol Lee, Seoul (KR); Chang Won Nam, Seoul (KR); Yun Gyu Bae, Suwon-si (KR); Won Joon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 15/793,329

(22) Filed: Oct. 25, 2017

(65) Prior Publication Data

US 2018/0115438 A1  Apr. 26, 2018

(30) Foreign Application Priority Data

Oct. 25, 2016 (KR) .................. 10-2016-0139020

(51) Int. Cl.
  *H04L 12/54* (2013.01)
  *H04W 76/16* (2018.01)
  (Continued)

(52) U.S. Cl.
  CPC .......... *H04L 12/5692* (2013.01); *H04L 47/41* (2013.01); *H04W 36/04* (2013.01);
  (Continued)

(58) Field of Classification Search
  CPC ..... H04L 12/5692; H04L 47/41; H04L 69/14; H04W 76/16; H04W 36/04; H04W 40/16;
  (Continued)

(56) References Cited

U.S. PATENT DOCUMENTS 8,874,124 B2 * 10/2014 Clegg .................. H04L 5/0062
                                                           455/452.1
9,549,360 B2    1/2017 Khawer et al.
                       (Continued)

FOREIGN PATENT DOCUMENTS

WO    2015/116159 A1    8/2015
WO    2016/062666 A2    4/2016

*Primary Examiner* — Ian N Moore
*Assistant Examiner* — Latresa A McCallum
(74) *Attorney, Agent, or Firm* — Jefferson IP Law, LLP

(57) ABSTRACT

An electronic device is provided. The electronic device includes one or more antennas that resonate within a licensed band and an unlicensed band, a first communication circuit electrically connected with at least part of the one or more antennas and processing an LTE signal, a second communication circuit electrically connected with at least part of the one or more antennas and processing a Wi-Fi signal, and a processor electrically connected with the first communication circuit and the second communication circuit. The processor is configured to obtain first data indicating a state of a first channel corresponding to a first communication protocol, obtain second data indicating a state of a second channel corresponding to a second communication protocol, select at least one communication protocol based on the first data and the second data, and perform communication through a communication circuit, which corresponds to the selected at least one communication protocol.

19 Claims, 11 Drawing Sheets

(51) Int. Cl.
    *H04L 12/891*     (2013.01)
    *H04W 40/16*     (2009.01)
    *H04W 84/12*     (2009.01)
    *H04W 36/04*     (2009.01)
    *H04W 72/12*     (2009.01)
    *H04L 29/06*     (2006.01)
    *H04W 40/24*     (2009.01)
    *H04W 88/06*     (2009.01)
    *H04W 36/06*     (2009.01)
    *H04W 72/04*     (2009.01)

(52) U.S. Cl.
    CPC ........... *H04W 40/16* (2013.01); *H04W 72/12* (2013.01); *H04W 72/1231* (2013.01); *H04W 76/16* (2018.02); *H04W 84/12* (2013.01); *H04L 69/14* (2013.01); *H04W 36/06* (2013.01); *H04W 40/246* (2013.01); *H04W 72/04* (2013.01); *H04W 88/06* (2013.01)

(58) Field of Classification Search
    CPC . H04W 72/12; H04W 72/1231; H04W 84/12; H04W 36/06; H04W 40/246; H04W 72/04; H04W 88/06
    See application file for complete search history.

(56) References Cited

U.S. PATENT DOCUMENTS

| | | | |
|---|---|---|---|
| 9,698,945 B2 | 7/2017 | Erceg et al. | |
| 2013/0031256 A1* | 1/2013 | Hampel | H04L 69/16 709/227 |
| 2015/0133184 A1 | 5/2015 | Sadek et al. | |
| 2016/0094317 A1 | 3/2016 | Erceg et al. | |
| 2016/0219487 A1 | 7/2016 | Khawer et al. | |
| 2016/0338019 A1 | 11/2016 | Ratasuk et al. | |
| 2017/0238319 A1 | 8/2017 | Luft et al. | |
| 2018/0092109 A1* | 3/2018 | Belghoul | H04B 7/0632 |

* cited by examiner

ELECTRONIC DEVICE AND METHOD FOR SETTING COMMUNICATION PROTOCOL

CROSS-REFERENCE TO RELATED APPLICATION(S)

This application claims the benefit under 35 U.S.C. § 119(a) of a Korean patent application filed on Oct. 25, 2016 in the Korean Intellectual Property Office and assigned Serial number 10-2016-0139020, the entire disclosure of which is hereby incorporated by reference.

TECHNICAL FIELD

The present disclosure relates to a technology that selects a communication protocol by an electronic device.

BACKGROUND

An electronic device such as a smartphone supports a cellular network such as third generation (3G) or long term evolution (LTE). In recent years, there has been a growing interest in a communication protocol that uses a signal within an unlicensed band to improve communication performance without the cost for purchasing a frequency. For example, LTE-Wi-Fi aggregation (LWA), multipath transmission control protocol (TCP) (MPTCP), smart bonding, and the like that use a signal received from a cellular network and a signal received from a Wi-Fi access point (AP) have been studied. In addition, licensed-assisted access (LAA) using LTE, LTE-unlicensed (LTE-U), and the like that use a signal within a licensed band and a signal within the unlicensed band, which are received from the cellular network, have been studied.

The above information is presented as background information only to assist with an understanding of the present disclosure. No determination has been made, and no assertion is made, as to whether any of the above might be applicable as prior art with regard to the present disclosure.

SUMMARY

The communication protocol using signals within the licensed band and the unlicensed band may be restrictedly used due to a characteristic of the unlicensed band. For example, efficiency of communication using the signal within the unlicensed band may increase or decrease depending on a state of a relay device (e.g., a small cell or a Wi-Fi AP). For another example, efficiency of communication using the signal within the unlicensed band may increase or decrease depending on a state of an electronic device (e.g., in device coexistence or interference).

Aspects of the present disclosure are to address at least the above-mentioned problems and/or disadvantages and to provide at least the advantages described below. Accordingly, an aspect of the present disclosure is to improve communication efficiency of an electronic device supporting various communication protocols using a signal within an unlicensed band.

In accordance with an aspect of the present disclosure, an electronic device is provided. The electronic device includes one or more antennas that resonate within a licensed band and an unlicensed band, a first communication circuit electrically connected with at least part of the one or more antennas and processing a long term evolution (LTE) signal, a second communication circuit electrically connected with at least part of the one or more antennas and processing a Wi-Fi signal, and a processor electrically connected with the first communication circuit and the second communication circuit. The processor is configured to obtain first data indicating a state of a first channel corresponding to a first communication protocol associated with a first LTE signal within the licensed band and a second LTE signal within the unlicensed band, obtain second data indicating a state of a second channel corresponding to a second communication protocol associated with the first LTE signal within the licensed band and the Wi-Fi signal within the unlicensed band, select at least one communication protocol of the first communication protocol or the second communication protocol based on the first data and the second data, and perform communication through a communication circuit, which corresponds to the selected at least one communication protocol, of the first communication circuit and the second communication circuit using the selected at least one communication protocol.

In accordance with another aspect of the present disclosure, an electronic device is provided. The electronic device includes a first communication interface configured to support a licensed band and an unlicensed band, a second communication interface configured to support the unlicensed band without supporting the licensed band, and a processor. The processor is configured to verify a first communication protocol available by the first communication interface or the second communication interface, verify a second communication protocol available by a communication network connected with a corresponding communication interface of the first communication interface or the second communication interface, verify first attribute information associated with a first channel corresponding to the first communication protocol, verify second attribute information associated with a second channel corresponding to the second communication protocol, and determine a protocol, which is to be active with respect to the unlicensed band, of the first communication protocol or the second communication protocol based on the first attribute information and the second attribute information.

In accordance with another aspect of the present disclosure, an electronic device is provided. The electronic device includes one or more antenna elements that resonate within a licensed band and an unlicensed band and at least one processor including a first communication circuit electrically connected with at least part of the one or more antennas elements and processing an LTE signal and a second communication circuit electrically connected with at least part of the one or more antennas elements and processing a Wi-Fi signal. The at least one processor may be configured to perform communication depending on communication protocols including one or more communication protocols associated with an LTE signal within the licensed band and an LTE signal within the unlicensed band and one or more communication protocols associated with an LTE signal within the licensed band and a Wi-Fi signal within the unlicensed band, obtain data associated with states of channels corresponding to the communication protocols, select at least one communication protocol of the communication protocols based on the data associated with the states of the channels, and perform communication using the at least one communication protocol.

In accordance with another aspect of the present disclosure, a method is provided. The method includes obtaining first data indicating a state of a first channel corresponding to a first communication protocol associated with a first LTE signal within a licensed band and a second LTE signal within an unlicensed band and second data indicating a state of a second channel corresponding to a second communication protocol associated with the first LTE signal within the licensed band and a Wi-Fi signal within the unlicensed band, selecting at least one communication protocol of the first communication protocol or the second communication protocol based at least on the first data and the second data, and performing communication through a corresponding communication circuit of first communication circuit and second communication circuit using the selected at least one communication protocol.

In accordance with another aspect of the present disclosure, a computer-readable recording medium has stored thereon instructions, when executed by at least one processor included in an electronic device, for performing a method is provided. The method includes obtaining first data indicating a state of a first channel corresponding to a first communication protocol associated with a first LTE signal within a licensed band and a second LTE signal within an unlicensed band and second data indicating a state of a second channel corresponding to a second communication protocol associated with the first LTE signal within the licensed band and a Wi-Fi signal within the unlicensed band, selecting at least one communication protocol of the first communication protocol or the second communication protocol based at least on the first data and the second data, and performing communication through a corresponding communication circuit of first communication circuit and second communication circuit using the selected at least one communication protocol.

Other aspects, advantages, and salient features of the disclosure will become apparent to those skilled in the art from the following detailed description, which, taken in conjunction with the annexed drawings, discloses various embodiments of the present disclosure.

According to various embodiments of the present disclosure, communication efficiency of an electronic device may be improved by selecting at least one communication protocol, the performance of which is good based on wireless environment states of protocols, from among a plurality of communication protocols that are available to one electronic device.

Besides, a variety of effects directly or indirectly understood through this disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
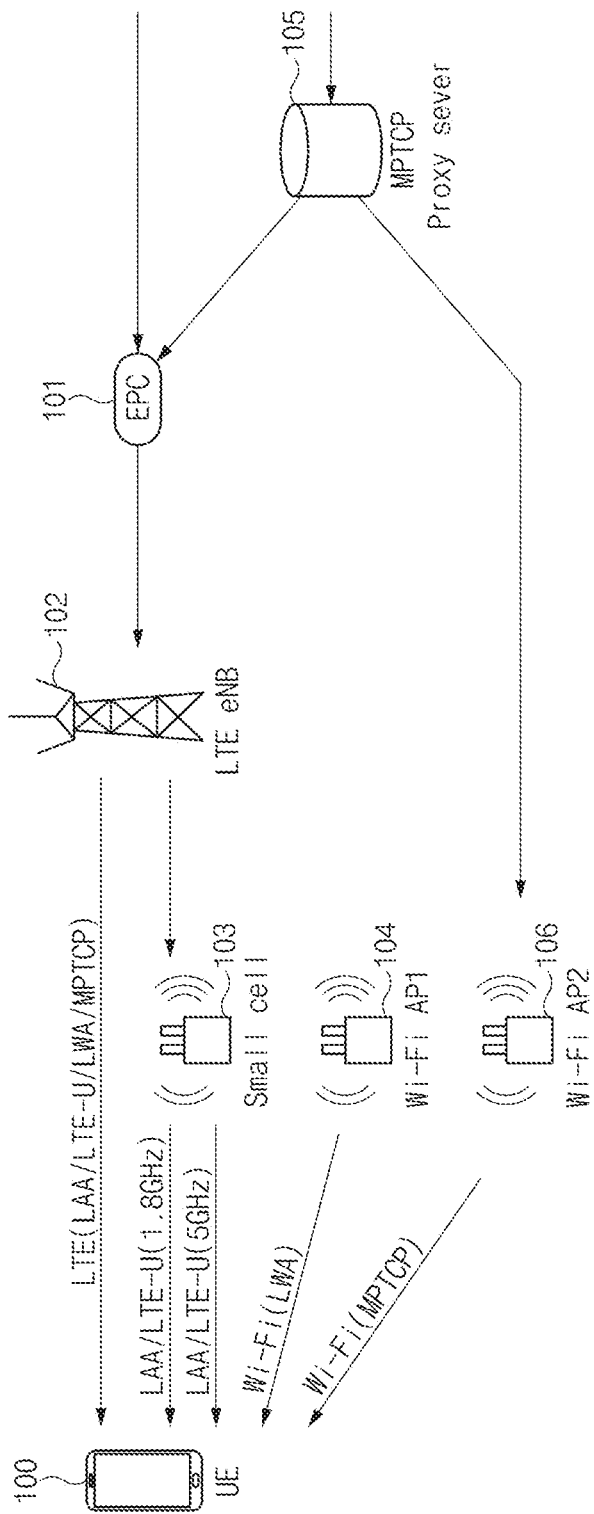
FIG. 1 illustrates an operating environment of an electronic device according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have," "may have," "include," and "comprise," or "may include" and "may comprise" used herein indicate existence of corresponding features (e.g., elements such as numeric values, functions, operations, or components) but do not exclude presence of additional features.

In this disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "operatively or communicatively coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used in this disclosure may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an operating environment of an electronic device according to an embodiment of the present disclosure.

Referring to FIG. 1, an electronic device 100 according to an embodiment may be a mobile device that a user utilizes. The electronic device 100 may be referred to as a "mobile device," a "mobile terminal," "user equipment (UE)," or the like.

The electronic device 100 according to an embodiment may communicate with an external device (e.g., a base station 102, a small cell 103, a first Wi-Fi access point (AP) 104, or a second Wi-Fi AP 106) within a licensed band and an unlicensed band. For example, the electronic device 100 may communicate using one or more communication protocols of long term evolution (LTE), licensed-assisted access (LAA) using LTE, LIE-unlicensed (LTE-U), LTE-Wi-Fi aggregation (LWA), LTE wireless local area network (WLAN) integration with Internet protocol security tunnel (LWIP), multipath TCP (MPTCP), or smart bonding. The electronic device 100 may support various communication protocols that simultaneously use the licensed band and the unlicensed band, in addition to the above-described communication protocols. After anchoring in an LTE channel using the licensed band, the electronic device 100 may perform communication depending on the above-described communication protocols by adding a channel using the unlicensed band. According to an embodiment, the electronic device 100 may select a part of the above-described communication protocols and may perform communication depending on the selected communication protocol.

According to an embodiment, the electronic device 100 may communicate with the base station 102 (or an evolved node B (eNB)) connected with an evolved packet core (EPC) 101 being a core network. The electronic device 100 may perform communication through the base station 102 in an LTE scheme. In this case, the electronic device 100 may communicate with the base station 102 within the licensed band.

According to an embodiment, the electronic device 100 may communicate with the small cell 103 connected with the base station 102. The electronic device 100 may perform communication through the small cell 103 in an LAA scheme or an LTE-U scheme. For example, the electronic device 100 may receive a signal of the licensed band (e.g., 1.8 GHz) and a signal of the unlicensed band (e.g., 5 GHz) from the small cell 103. Herein, each of the signal of the licensed band and the signal of the unlicensed band may be a signal based on an LTE standard. The electronic device 100 may anchor in a primary cell (PCell) of the licensed band and may perform communication in an LAA scheme or an LTE-U scheme by adding a secondary cell (SCell) of the unlicensed band.

According to an embodiment, the electronic device 100 may communicate with the first Wi-Fi AP 104. The electronic device 100 may perform communication through the first Wi-Fi AP 104 in a Wi-Fi scheme. In this case, the electronic device 100 may perform communication through the base station 102 and the first Wi-Fi AP 104 in an LWA scheme. For example, the electronic device 100 may aggregate the licensed band used for LTE communication with the base station 102 and the unlicensed band used for Wi-Fi communication with the first Wi-Fi AP 104. The first Wi-Fi AP 104 used for the LWA scheme may be connected with the base station 102.

According to an embodiment, the electronic device 100 may perform communication through the base station 102 and the first Wi-Fi AP 104 in a smart bonding scheme. For example, the electronic device 100 may aggregate the licensed band used for LTE communication with the base station 102 and the unlicensed band used for Wi-Fi communication with the first Wi-Fi AP 104 at an application level.

According to an embodiment, the electronic device 100 may perform communication in an LWIP scheme. For example, the electronic device 100 may aggregate the licensed band used for LTE communication with the base station 102 and the unlicensed band used for Wi-Fi communication with the first Wi-Fi AP 104 at an Internet protocol level.

According to an embodiment, the electronic device 100 may communicate with the second Wi-Fi AP 106. The electronic device 100 may perform communication through the second Wi-Fi AP 106 in the Wi-Fi scheme. In this case, the electronic device 100 may perform communication through the base station 102 and the second Wi-Fi AP 106 in the MPTCP scheme. For example, the electronic device 100 may aggregate the licensed band used for LTE communication with the base station 102 and the unlicensed band used for Wi-Fi communication with the second Wi-Fi AP 106 at a TCP level. The second Wi-Fi AP 106 used for the MPTCP scheme may be connected with an MPTCP proxy server 105.

As described above, the electronic device 100 may perform communication in various schemes such as LTE, LAA, LTE-U, LWA, MPTCP, LWIP, and/or smart bonding. The electronic device 100 according to an embodiment may select one or more schemes having high communication efficiency from various schemes such as LTE, LAA, LTE-U, LWA, MPTCP, and/or smart bonding. Hereinafter, an operation of the electronic device 100 for selecting a part of various communication schemes will be described in detail.

Figure 2:
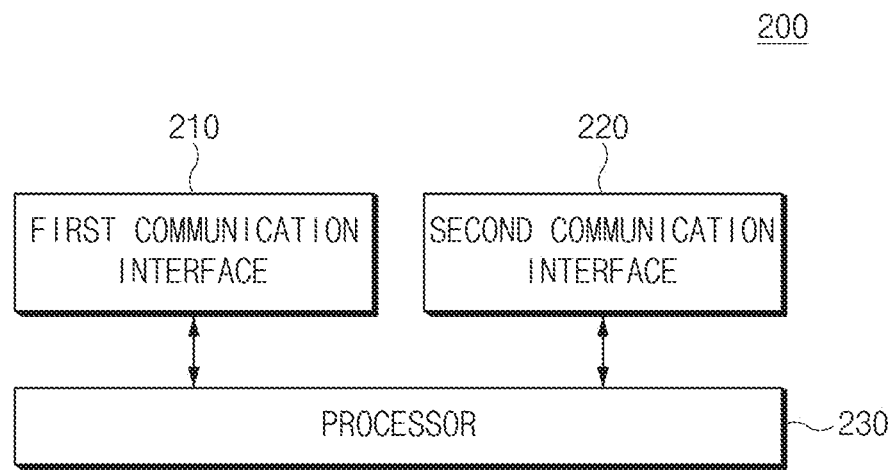
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 200 may be a mobile device that a user utilizes. The electronic device 200 may be referred to as a "mobile device," a "mobile terminal," a "UE," or the like.

The electronic device 200 may include a first communication interface 210, a second communication interface 220, and a processor 230. The electronic device 200 illustrated in FIG. 2 may further include additional elements such as an application processor, a memory, and a display in addition to the illustrated element. For example, the electronic device 200 may further include a touch integrated circuit (IC), a camera, a microphone, a speaker, and/or a sensor.

The first communication interface 210 may support a licensed band and an unlicensed band. For example, the first communication interface 210 may transmit an LTE signal within the licensed band and an LTE signal within the unlicensed band. The first communication interface 210 may receive an LTE signal from an external relay device (e.g., the base station 102 or the small cell 103 of FIG. 1) and may transmit the received LTE signal to the processor 230.

The second communication interface 220 may not support the licensed band and may support the unlicensed band. For example, the second communication interface 220 may transmit a Wi-Fi signal within the unlicensed band. The second communication interface 220 may receive the Wi-Fi signal from an external relay device (e.g., the first Wi-Fi AP 104 and the second Wi-Fi AP 106 of FIG. 1) and may transmit the received Wi-Fi signal to the processor 230.

The processor 230 may be electrically connected with the first communication interface 210 and the second communication interface 220. According to an embodiment, the processor 230 may verify a first communication protocol, which is available by the first communication interface 210 or the second communication interface 220 and a second communication protocol available by a communication network connected with a corresponding communication interface of the first communication interface 210 or the second communication interface 220. The first communication protocol and the second communication protocol may be a communication protocol using the licensed band and the unlicensed band. The first communication protocol and the second communication protocol may include at least a part of LTE, LAA, LTE-U, LWA, MPTCP, LWIP, or smart bonding.

According to an embodiment, the processor 230 may verify first attribute information about a first channel corresponding to the first communication protocol and second attribute information about a second channel corresponding to the second communication protocol. For example, the first attribute information may include information such as received signal strength indication (RSSI), reference signal received power (RSRP), reference signal received quality (RSRQ), signal to interference plus noise ratio (SINR), an available bandwidth, a distance from a relay device, a band supported by the relay device, RSSI of the relay device, SINR of the relay device, the number of available relay devices, an activation condition of a communication protocol, and/or traffic that is associated with the first channel. For example, the second attribute information may include information such as RSSI, RSRP, RSRQ, SINR, an available bandwidth, a distance from a relay device, a band supported by the relay device, RSSI and SINR of the relay device, the number of available relay devices, an activation condition of a communication protocol, and/or traffic that is associated with the second channel.

Herein, for example, the available bandwidth may indicate carrier aggregation capability and/or the number of SCells that is associated with LTE, and may indicate whether channel bonding is supported and/or an available maximum bandwidth that is associated with Wi-Fi. For example, the distance from the relay device may indicate a distance between the electronic device 200 and a base station, a small cell, a Wi-Fi AP, or the like that is capable of being connected with a terminal, and may estimate the distance from the relay device using GPS, control plane (CP) positioning, or the like. For example, the band supported by the relay device may indicate a frequency band (e.g., 2.4 GHz or 5 GHz) that a Wi-Fi AP supports. For example, RSSI and SINR of the relay device may be a value that indicates channel quality of the relay device connectable to the electronic device 200. For example, the number of available relay devices may indicate the maximum number of relay devices or the maximum number of SCells, which is connectable to the electronic device 200. For example, the activation condition of the communication protocol may indicate a ratio in which a bandwidth of a PCell is saturated, data traffic of the PCell, or the like.

According to an embodiment, the processor 230 may verify attribute information associated with the electronic device 200. For example, the processor 230 may verify a mode in which the electronic device 200 determines a communication protocol. For example, the electronic device 200 may determine the communication protocol in a preference mode, a performance mode, a power saving mode, or the like. For example, third attribute information may include data indicating at least one of a communication protocol supported by an electronic device, moving speed of an electronic device, whether handover is supported, a battery level, a hot spot provided by an electronic device, and a ratio of uplink traffic to downlink traffic.

According to an embodiment, the processor 230 may verify attribute information associated with states of a first network connected through the first channel and a second network connected through the second channel. For example, the processor 230 may verify the states of the first network and the second network in real time.

According to an embodiment, the processor 230 may determine a protocol, which is to be active with respect to an unlicensed band, of the first communication protocol or the second communication protocol based on the first attribute information and the second attribute information. For example, if the first attribute information satisfies a specified condition, the processor 230 may determine the first communication protocol as the protocol to be active with respect to the unlicensed band. For another example, if the second attribute information satisfies the specified condition, the processor 230 may determine the second communication protocol as the protocol to be active with respect to the unlicensed band. In detail, an operation of determining a protocol using the first attribute information and the second attribute information will be described with reference to FIG. 7. The processor 230 may allow communication to be performed using the determined protocol or a combination of protocols, and may perform an operation for notifying a base station of the determined protocol or the combination of protocols. The processor 230 may determine the protocol to be active with respect to the unlicensed band, periodically or if a specified event occurs.

According to an embodiment, the processor 230 may determine the protocol, which is to be active with respect to the unlicensed band, of the first communication protocol or the second communication protocol based on attribute information associated with the electronic device 200. The processor 230 may determine the protocol to be active in a manner changed depending on a mode of the electronic device 200. The operation of determining the protocol to be active depending on the mode of the electronic device 200 will be described with reference to FIG. 8.

According to an embodiment, the processor 230 may determine the protocol, which is to be active with respect to the unlicensed band, of the first communication protocol or the second communication protocol based on attribute information associated with a state of a network. The processor 230 may set the protocol to be active or the combination of protocols while considering the state of the network in real time.

According to an embodiment, in the case where the first communication protocol is active, the processor 230 may control the unlicensed band using the first communication interface 210. In the case where the second communication protocol is active, the processor 230 may control the unlicensed band using the second communication interface 220. The unlicensed band may include a first frequency band and a second frequency band. For example, the first frequency band may be 5 GHz, and the second frequency band may be 2.4 GHz. The processor 230 may control the first frequency band using the first communication interface 210 and may control the second frequency band using the second communication interface 220.

The electronic device 200 may perform an operation, which is to be described below in detail, depending on a determination of the protocol to be active.

For example, while performing communication in an LTE-U or LAA scheme, the electronic device 200 may allow a Wi-Fi protocol to be active. In this case, the electronic device 200 may report a channel quality indicator (CQI) report of "0" to a small cell connected with the electronic device 200. As a result, the electronic device 200 may guide a base station such that the base station does not transmit traffic to the SCell.

For another example, while performing communication in an LWA scheme, the electronic device 200 may allow the electronic device 200 to be connected with LAA, LTE-U or a general Wi-Fi AP. In this case, the electronic device 200 may provide a notification that a connection with an LWA Wi-Fi AP (e.g., the first Wi-Fi AP 104 of FIG. 1) is ended, by transmitting a WLANConnectionStatusReport-r13-IEs ("failureInternal"), which is based on a Release-13 standard, to the PCell. Here, the "failureInternal" may be used to end the connection with the LWA Wi-Fi AP, by a user selection or another reason.

For another example, while performing communication in a Wi-Fi scheme, the electronic device 200 may allow the LAA or LTE-U protocol to be active. In this case, the electronic device 200 may transmit a message indicating to support LAA or LTE-U through UE capability, and may report the CQI report of an LTE-U SCell of a value greater than "0." As a result, the electronic device 200 may guide the base station such that the base station does transmit traffic to the SCell.

For another example, the electronic device 200 may perform communication, which is capable of satisfying quality information, using a part of communication protocols to be active depending on a data service request of a plurality of applications having different quality information (e.g., quality of experience (QoE)). For another example, the electronic device 200 may determine the communication protocol to be active, based on priorities of the different quality information. For example, the electronic device 200 may verify the highest quality information (e.g., on a QoE level) of pieces of quality information and may determine a communication protocol, which is capable of supporting the verified highest quality information, as the communication protocol to be active.

According to an embodiment, the electronic device 200 may further include a memory (not illustrated) in which a plurality of applications are stored, and the processor 230 may verify quality information associated with each of the plurality of applications and may determine a protocol, which is to be active with respect to the unlicensed band, of the first communication protocol or the second communication protocol based on the quality information. For example, communication quality that each of the plurality of applications requires may be different. The processor 230 may determine a communication protocol, which satisfies communication quality that the executed application requires, of the first communication protocol or the second communication protocol as the communication protocol to be active with respect to the unlicensed band.

Figure 3:
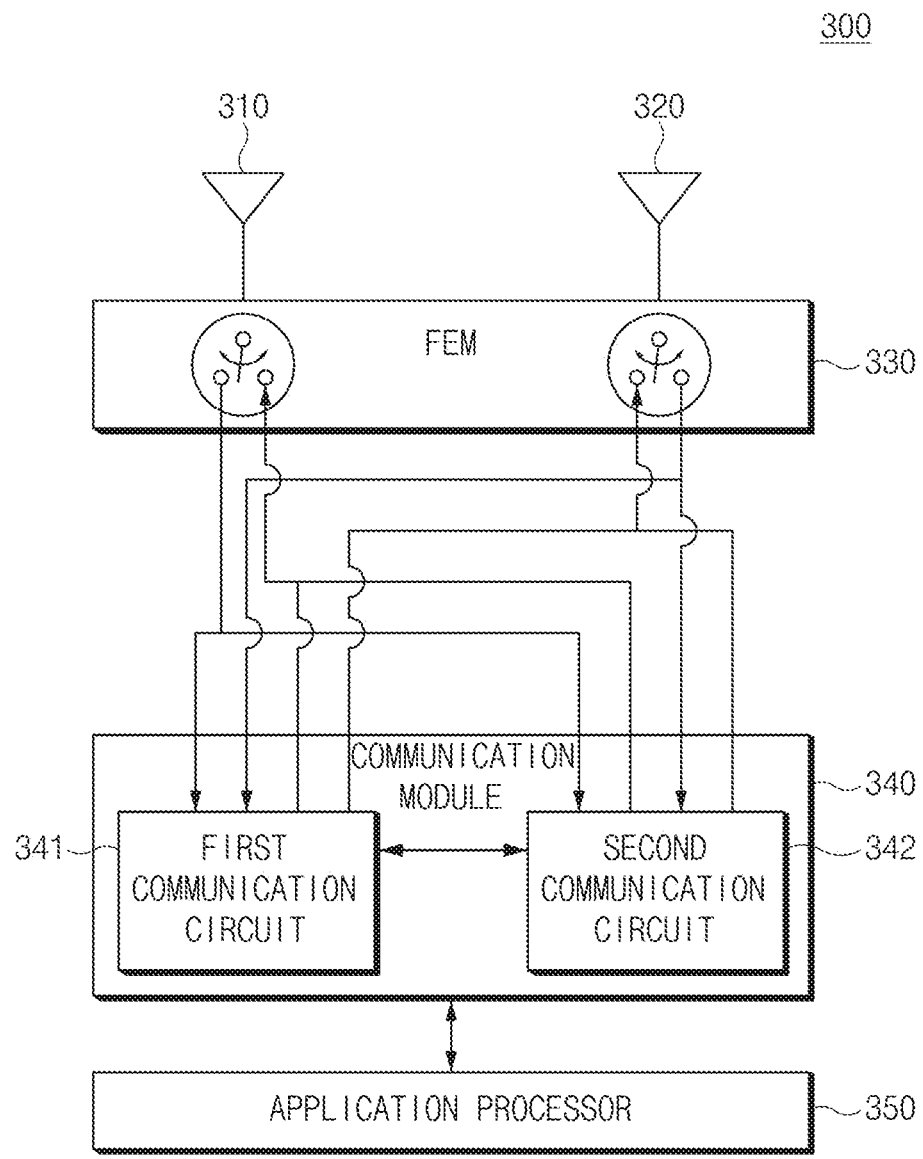
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, an electronic device 300 may be a mobile device that a user utilizes. The electronic device 300 may be referred to as a "mobile device," a "mobile terminal," a "UE," or the like.

The electronic device 300 may include a first antenna element 310, a second antenna element 320, a front end module (FEM) 330, a communication module 340, and an application processor 350. The electronic device 300 illustrated in FIG. 3 may further include additional elements such as a memory and a display in addition to the illustrated element. For example, the electronic device 300 may further include a touch integrated circuit (IC), a camera, a microphone, a speaker, various sensors, and the like.

The first antenna element 310 and the second antenna element 320 may be configured to resonate within a licensed band and an unlicensed band, respectively. For example, the first antenna element 310 may be configured to resonate within the licensed band, and the second antenna element 320 may be configured to resonate within the unlicensed band. For another example, the first antenna element 310 may be configured to resonate within the licensed band and the unlicensed band, and the second antenna element 320 may be configured to resonate within the unlicensed band. For another example, the first antenna element 310 may be configured to resonate within the licensed band, and the second antenna element 320 may be configured to resonate within the licensed band and the unlicensed band. For another example, each of the first antenna element 310 and the second antenna element 320 may be configured to resonate within the licensed band and the unlicensed band. The electronic device 300 may transmit or receive a signal of the licensed band and a signal of the unlicensed band using the first antenna element 310 and the second antenna element 320.

The electronic device 300 is illustrated in FIG. 3 as including two antenna elements. However, embodiments are not limited thereto. For example, the electronic device 300 may include three or more antenna elements. For example, the electronic device 300 may include four antenna elements. In this case, the electronic device 300 may transmit or receive an LTE signal using two antenna elements, and may transmit or receive a Wi-Fi signal using the remaining two antenna elements.

The FEM 330 may be electrically connected with the first antenna element 310 and the second antenna element 320. The FEM 330 may process signals received through the first antenna element 310 and the second antenna element 320. The FEM 330 may process a signal received from the communication module 340. For example, the FEM 330 may separate the received signal for each band, and may process the separated signal. The FEM 330 may amplify a signal and may remove a noise from the signal.

The communication module 340 may be electrically connected with the FEM 330. The communication module 340 may be electrically connected with the first antenna element 310 and the second antenna element 320 through the FEM 330. The communication module 340 may include a first communication circuit 341 and a second communication circuit 342. In the present disclosure and the accompanying claims, the communication module 340 may be referred to as a "processor" or a "communication processor." The first communication circuit 341 and the second communication circuit 342 are illustrated in FIG. 3 as being included in the communication module 340. However, embodiments are not limited thereto. For example, the first communication circuit 341 and the second communication circuit 342 may be separate from the communication module 340 and may be interposed between the FEM 330 and the communication module 340. The first communication circuit 341 and the second communication circuit 342 may be similar to the first communication interface 210 and the second communication interface 220 illustrated in FIG. 2, respectively.

The first communication circuit 341 may process an LTE signal. The first communication circuit 341 may be a modem configured to process the LTE signal. The first communication circuit 341 may process an LTE signal within the licensed band and an LTE signal within the unlicensed band. Communication schemes such as LTE, LAA, LTE-U, and the like may be implemented by the first communication circuit 341. The first communication circuit 341 may process an LTE signal used in the communication schemes such as LWA, MPTCP, LWIP, smart bonding, and the like.

The second communication circuit 342 may process a Wi-Fi signal. The second communication circuit 342 may be a Wi-Fi module configured to process the Wi-Fi signal. The second communication circuit 342 may process the Wi-Fi signal that is a signal within the unlicensed band. Communication schemes such as Wi-Fi, LWA, MPTCP, LWIP, smart bonding, and the like may be implemented by the second communication circuit 342.

The first communication circuit 341 may be electrically connected with the second communication circuit 342. In the case where the first communication circuit 341 is connected with the second communication circuit 342, the first communication circuit 341 and/or the second communication circuit 342 may control the FEM 330 and may control transmitting (Tx)/receiving (Rx) paths between the first communication circuit 341 and the FEM 330 and between the second communication circuit 342 and the FEM 330.

The communication module 340 may perform communication using at least one of the first communication circuit 341 and the second communication circuit 342 depending on one or more communication protocols (e.g., a first communication protocol) associated with an LTE signal (e.g., a first LTE signal) within the licensed band and an LTE signal (e.g., a second LTE signal) within the unlicensed band and one or more communication protocols (e.g., a second communication protocol) associated with the LTE signal within the licensed band and a Wi-Fi signal within the unlicensed band. Herein, one or more communication protocols associated with the LTE signal within the licensed band and the LTE signal within the unlicensed band may include one or more communication protocols of LAA and LTE-U. One or more communication protocols associated with the LTE signal within the licensed band and the Wi-Fi signal within the unlicensed band may include one or more communication protocols of LWA, MPTCP, LWIP, and smart bonding.

According to an embodiment, the communication module 340 may obtain data (e.g., first data indicating a state of the first channel and second data indicating a state of the second channel) associated with states of channels (e.g., the first channel corresponding to the first communication protocol and the second channel corresponding to the second communication protocol) corresponding to communication protocols. For example, the data associated with the states of channels may include data associated with at least one of RSSI, RSRP, RSRQ, SINR, an available bandwidth, a distance from a relay device, a band that the relay device supports, RSSI of the relay device, SINR of the relay device, the number of available relay devices, an activation condition of a communication protocol, or traffic. The communication module 340 may verify the states of channels corresponding to the communication protocol, periodically or if a specified event occurs.

According to an embodiment, the communication module 340 may obtain at least one of data associated with the state of the electronic device 300 (or data indicating the state of the electronic device 300) and data associated with a user of the electronic device 300 together with the data associated with the states of channels.

For example, the data associated with the state of the electronic device 300 may include data associated with at least one of a communication protocol supported by the electronic device 300, a moving speed of the electronic device 300, support of handover, a battery level, states of elements included in the electronic device 300, a hot spot provided by the electronic device 300, and a ratio of uplink traffic to downlink traffic. For example, the communication protocol supported by the electronic device 300 may be verified based on information of a subscriber identification module (SIM) card and a public land mobile network (PLMN) of a provider of the currently connected network. For example, the moving speed of the electronic device 300, which is a physical moving speed of the electronic device 300, may be used to verify the possibility of handover between a plurality of base stations or between small cells. For example, whether handover is supported may indicate the possibility of handover between a small cell and a Wi-Fi AP. For example, data associated with the battery may indicate a battery level. For example, the states of elements included in the electronic device 300 may indicate whether an element such as the communication module 340, the application processor 350, or the like wakes up (e.g., is active). For example, the data associated with a hot spot may be data associated with whether the electronic device 300 provides a hot spot, and a frequency band of a hot spot that the electronic device 300 provides. For example, the ratio of uplink traffic to downlink traffic may be data for comparing an amount of uplink data with an amount of downlink data.

For example, the data associated with the user of the electronic device 300 may be data indicating a communication protocol that a user prefers. The data associated with the user of the electronic device 300 may indicate an order of communication protocols that the user prefers.

According to an embodiment, the communication module 340 may select at least one communication protocol of communication protocols based on the data associated with the states of channels. The communication module 340 may select a communication protocol corresponding to a channel in which the data associated with the states satisfies a specified condition. For example, the communication module 340 may select a communication protocol, communication efficiency of which is relatively high, of communication protocols. For example, the electronic device 300 may select a communication protocol corresponding to a channel, RSSI, RSRP, RSRQ, and/or SINR of which is relatively high. For another example, the communication module 340 may select a communication protocol corresponding to a channel with little traffic, an available bandwidth of which is wide, in which a distance from a relay device is close, an RSSI and SINR of the relay device are high, the number of available relay devices is great, or an activation condition of the communication protocol is satisfied. A detailed embodiment in which a communication protocol is selected will be described with reference to FIGS. 7 and 8 in detail.

According to an embodiment, the communication module 340 may select at least one communication protocol of communication protocols based on the data associated with the states of channels and the data associated with the state of the electronic device 300. For example, the communication module 340 may select at least one communication protocol of communication protocols supported by the electronic device 300. For another example, the communication module 340 may select a communication protocol suitable for the state of the electronic device 300 such as a moving speed of the electronic device 300, support of handover, a battery level, states of elements included in the electronic device 300, a hot spot provided by the electronic device 300, a ratio of uplink traffic to downlink traffic, or the like. In the case where the moving speed of the electronic device 300 is higher than a specified value, the communication module 340 may select a communication protocol (e.g., LAA or LTE-U) that is easily handed over. The communication module 340 may select a communication protocol (e.g., LAA or LTE-U), which is easily handed over, of communication protocols. In the case where a battery level is lower than a specified value, the communication module 340 may select a communication protocol (e.g., LWA, MPTCP, or smart bonding in the case where the application processor 350 of the electronic device 300 wakes up) that consumes less battery power. In the case where an element of the electronic device 300 associated with the communication protocol wakes up, the communication module 340 may select the corresponding communication protocol. In the case where the hot spot of the electronic device 300 is enabled, the communication module 340 may select a communication protocol that does not use a frequency band of the hot spot. In the case where the uplink traffic is greater than the downlink traffic, the communication module 340 may select the communication protocol (e.g., LAA, LWA, MPTCP, LWIP, or smart bonding) supporting uplink. Other embodiments in which a communication protocol is selected will be described with reference to FIG. 8 in detail.

According to an embodiment, the communication module 340 may be configured to select at least one communication protocol of communication protocols based on the data associated with states of communication protocols and the data associated with the user of the electronic device 300. For example, the communication module 340 may select at least one communication protocol of communication protocols based on the preference of the user.

According to an embodiment, the communication module 340 may verify one or more available communication protocols of communication protocols based on the data associated with states of channels and may select at least one communication protocol of the one or more available communication protocols based on at least one of data associated with a state of a channel corresponding to the one or more available communication protocols, the data associated with the state of the electronic device 300, and the data associated with the user of the electronic device 300. For example, after selecting communication protocols that the electronic device 300 is capable of currently supporting, the communication module 340 may select a communication protocol, which has high efficiency, of the selected communication protocols.

According to an embodiment, the communication module 340 may perform communication using at least one communication protocol. The communication module 340 may perform communication using a communication circuit, which supports the selected communication protocol, from among the first communication circuit 341 and the second communication circuit 342. The communication module 340 may control another element in the electronic device 300 such that the communication is performed using the selected communication protocol.

According to an embodiment, the communication module 340 may transmit data to a relay device (e.g., the base station 102, the small cell 103, the first Wi-Fi AP 104, or the second Wi-Fi AP 106 in FIG. 1) to perform the communication using the selected communication protocol. For example, the communication module 340 may determine a CQI to be transmitted to the relay device (e.g., the small cell 103 of FIG. 1) transmitting an LTE signal based on the selected communication protocol. For example, in the case where LAA or LTE-U is not selected, the communication module 340 may transmit a CQI report of "0" to the small cell 103. For another example, in the case where LAA or LTE-U is selected, the communication module 340 may transmit the CQI report, which is higher than "0," to the small cell 103.

In addition, detailed operations performed by the electronic device 200 described with reference to FIG. 2 may be performed by the electronic device 300.

The application processor 350 may be electrically connected with the communication module 340. At least a part of operations described above as being performed by the communication module 340 may be performed by the application processor 350. In the present disclosure and the accompanying claims, the application processor 350 may be referred to as a "processor."

According to various embodiments, the electronic device 300 may estimate throughput that is expected in the case where the electronic device 300 uses a communication protocol supported by the electronic device 300. Hereinafter, an LAA throughput estimating method and a Wi-Fi throughput estimating method will be exemplarily described.

The electronic device 300 may expect LAA throughput. First of all, the electronic device 300 may calculate a link quality (link quality estimator). The electronic device 300 may measure energy $E_{subcarrier}$ of each subcarrier. The subcarrier may include a pilot subcarrier and a normal subcarrier.

Next, the electronic device 300 may calculate an available resource (available cell resource estimator). The electronic device 300 may determine whether a specific resource block (RB) is being used, using energy $E_{subcarrier}$ of the subcarrier. The electronic device 300 may calculate a ratio $R_{IDLE}$ of a resource block, which is being unused, to the entire resource block.

Next, the electronic device 300 may estimate a modulation coding scheme (MCS) (link quality to MCS estimator). The base station may determine the MCS that the electronic device 300 will use in downlink, and the base station may determine the MCS using a channel state that the electronic device 300 transmits. In this case, since the electronic device 300 reports the channel state of the electronic device 300 itself, the electronic device 300 may not know an algorithm used by the base station. The electronic device 300 may continuously store the channel state, which the electronic device 300 itself reports, and the MCS determined by the base station. The electronic device 300 may estimate MCS, which the base station will select, based on the stored data.

Next, the electronic device 300 may calculate an occupancy of a channel (channel occupancy estimator). Since the SCell of LAA uses an unlicensed band, the SCell of LAA may use the channel through listen before talk (LBT) in a time division multiple access (TDMA) scheme, together with another SCell and a Wi-Fi AP. Accordingly, idle channel time $T_{IDLE}$ may be measured by measuring the channel state during the total time $T_{WINDOW}$.

Next, the electronic device 300 may estimate LAA throughput using the calculated value. An equation for estimating the LAA throughput is as follows:

$$MCS(E_{Subcarrier}) \times R_{IDLE} \times \frac{T_{IDLE}}{T_{WINDOW}} \times \alpha \qquad \text{Equation 1}$$

In above Equation 1, "$\alpha$" ($0 < \alpha \leq 1$) may be a parameter for correcting a part, which is not capable of being used, of an idle channel corresponding to $T_{IDLE}$.

The electronic device 300 may expect Wi-Fi throughput. First of all, the electronic device 300 may calculate a link quality (link quality estimator). The electronic device 300 may receive a beacon frame that the Wi-Fi AP periodically transmits, and may measure strength of the received signal. The electronic device 300 may measure the received signal strength (RSS) that is the strength of the received signal of the entire frame, or may measure per-subcarrier SNR.

Next, the electronic device 300 may estimate the MCS (link quality to MCS estimator). The MCS that the electronic device 300 will use in downlink may be determined by an AP. Unlike LTE, the electronic device 300 may not report the channel state of the electronic device 300 to the AP in Wi-Fi. The electronic device 300 may continuously store the channel state of the electronic device 300 and MCS that the AP uses. The electronic device 300 may estimate MCS, which is to be selected by the AP, based on the stored data.

Next, the electronic device 300 may calculate an occupancy of a channel (channel occupancy estimator). Since the Wi-Fi uses the unlicensed band, the Wi-Fi may use the channel through LBT in a TDMA scheme together with another SCell and another Wi-Fi AP. Accordingly, idle channel time $T_{IDLE}$ may be measured by measuring the channel state during the total time $T_{WINDOW}$.

Next, the electronic device 300 may finally estimate Wi-Fi throughput using the calculated value. An equation for estimating the Wi-Fi throughput is as follows:

$$MCS(RSS, SNR) \times \frac{T_{IDLE}}{T_{WINDOW}} \times \alpha \qquad \text{Equation 2}$$

In above Equation 2, "$\alpha$" ($0 < \alpha \leq 1$) may be a parameter for correcting a part, which is not capable of being used, of an idle channel corresponding to $T_{IDLE}$.

Figure 4:
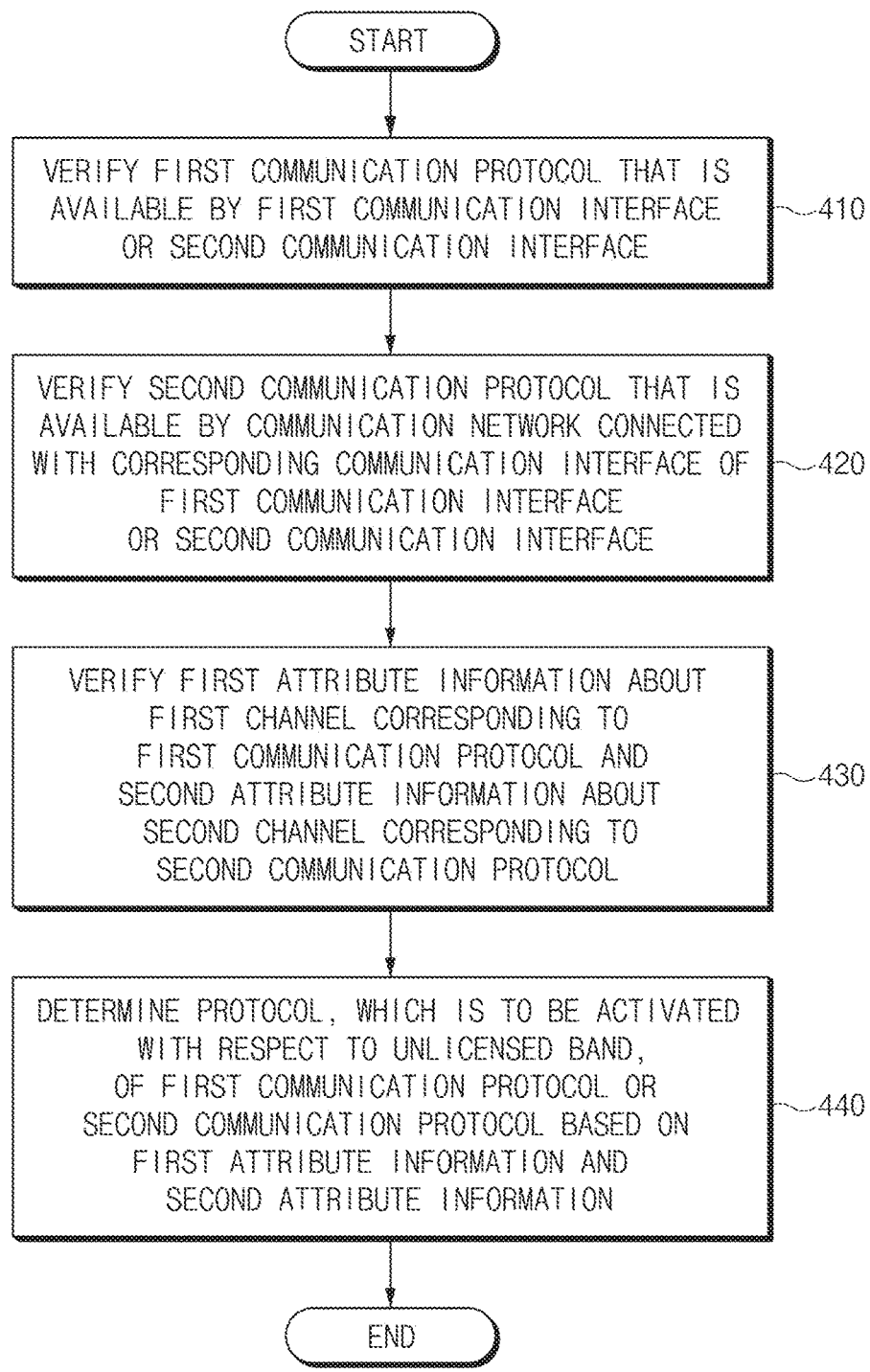
FIG. 4 is a flowchart for describing a communication scheme setting method of an electronic device according to an embodiment of the present disclosure.

FIG. 4 is a flowchart for describing a communication scheme setting method of an electronic device, according to an embodiment of the present disclosure.

Hereinafter, it is assumed that the electronic device 100 of FIG. 1, the electronic device 200 of FIG. 2, or the electronic device 300 of FIG. 3 performs a process of FIG. 4. In addition, in details of FIG. 4, it is understood that an operation described as being performed by an electronic device is controlled by the processor 230 of the electronic device 200, the communication module 340 of the electronic device 300, or the application processor 350 of the electronic device 300.

Referring to FIG. 4, in operation 410, the electronic device may verify a first communication protocol that is available by a first communication interface or a second communication interface. In operation 420, the electronic device may verify the second communication protocol that is available by a communication network connected with a corresponding communication interface of the first communication interface or the second communication interface. For example, the first communication protocol and the second communication protocol may be a communication protocol using a licensed band and an unlicensed band. For example, the first communication protocol and the second communication protocol may include at least a part of LTE, LAA, LTE-U, LWA, LWIP, MPTCP, and smart bonding.

Operation 410 and operation 420 are illustrated in FIG. 4 as being sequentially performed. However, embodiments are not limited thereto. For example, operation 410 and operation 420 may be performed at the same time or may be performed in a reverse sequence.

In operation 430, the electronic device may verify first attribute information about a first channel corresponding to the first communication protocol and second attribute information about a second channel corresponding to the second communication protocol. For example, the first attribute information may include information such as RSSI, RSRP, RSRQ, SINR, an available bandwidth, a distance from a relay device, a band supported by the relay device, RSSI of the relay device, SINR of the relay device, the number of available relay devices, an activation condition of a communication protocol, and/or traffic that is associated with the first channel. For example, the second attribute information may include information such as RSSI, RSRP, RSRQ, SINR, an available bandwidth, a distance from a relay device, a band supported by the relay device, RSSI of the relay device, SINR of the relay device, the number of available relay devices, an activation condition of a communication protocol, and/or traffic that is associated with the second channel.

In operation 440, the electronic device may determine a protocol, which is to be active with respect to an unlicensed band, of the first communication protocol or the second communication protocol based on the first attribute information and the second attribute information. For example, if the first attribute information satisfies a specified condition, the electronic device may determine the first communication protocol as the protocol to be active with respect to the unlicensed band. If the second attribute information satisfies the specified condition, the electronic device may determine the second communication protocol as the protocol to be active with respect to the unlicensed band. The electronic device may allow communication to be performed using the determined protocol or a combination of protocols, and may perform an operation for notifying a base station of the determined protocol or the combination of protocols. The electronic device may determine the protocol to be active with respect to the unlicensed band, periodically or if a specified event occurs.

Figure 5:
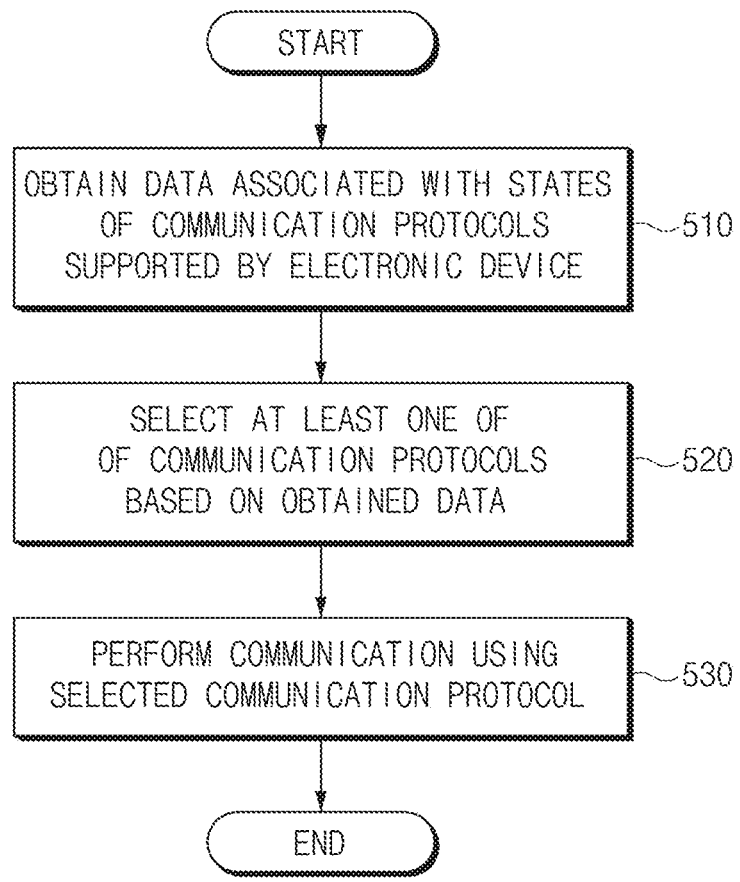
FIG. 5 is a flowchart for describing a communication scheme setting method of an electronic device according to an embodiment of the present disclosure.

FIG. 5 is a flowchart for describing a communication scheme setting method of an electronic device according to an embodiment of the present disclosure.

Hereinafter, it is assumed that the electronic device 100 of FIG. 1, the electronic device 200 of FIG. 2, or the electronic device 300 of FIG. 3 performs a process of FIG. 5. In addition, in details of FIG. 5, it is understood that an operation described as being performed by an electronic device is controlled by the processor 230 of the electronic device 200, the communication module 340 of the electronic device 300, or the application processor 350 of the electronic device 300.

Referring to FIG. 5, in operation 510, the electronic device may obtain data associated with states of communication protocols supported by the electronic device. For example, the electronic device may obtain data associated with at least one of RSSI, RSRP, RSRQ, SINR, an available bandwidth, a distance from a relay device, a band that the relay device supports, RSSI of the relay device, SINR of the relay device, the number of available relay devices, an activation condition of a communication protocol, or traffic that is associated with each of the communication protocols. The electronic device may obtain data associated with a state of the electronic device and/or data associated with a user of the electronic device. The electronic device may obtain the above-described data, periodically or when a specified event occurs.

In operation 520, the electronic device may select at least one of communication protocols based on the obtained data. For example, the electronic device may select a communication protocol, the efficiency of which is relatively high, from among communication protocols such as LAA, LTE-U, LWA, LWIP, MPTCP, and/or smart bonding based on the obtained data.

In operation 530, the electronic device may perform communication using the selected communication protocol. The electronic device may control elements included in the electronic device to perform the communication using the selected communication protocol, and may transmit data (e.g., CQI report) associated with a relay device that communicates with the electronic device.

Figure 6:
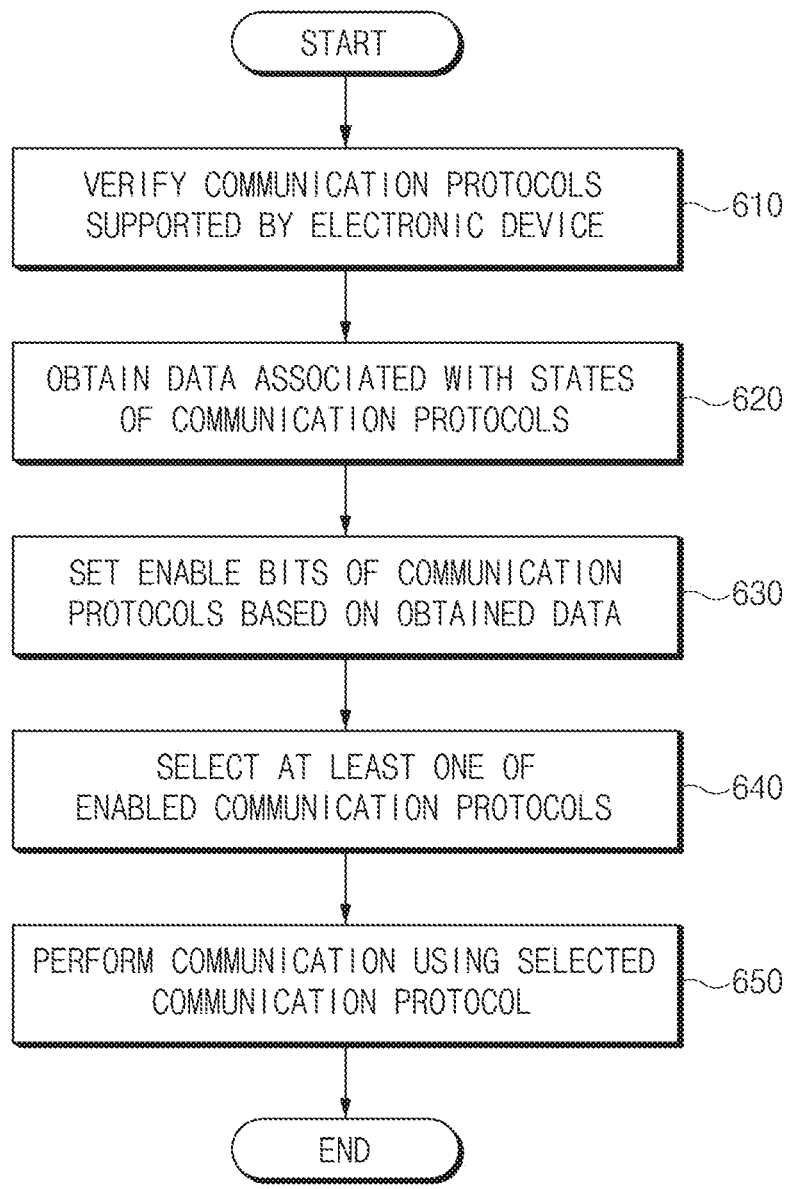
FIG. 6 is a flowchart for describing a communication scheme setting method of an electronic device according to an embodiment of the present disclosure.

FIG. 6 is a flowchart for describing a communication scheme setting method of an electronic device according to an embodiment of the present disclosure.

Hereinafter, it is assumed that the electronic device 100 of FIG. 1, the electronic device 200 of FIG. 2, or the electronic device 300 of FIG. 3 performs a process of FIG. 6. In addition, in details of FIG. 6, it is understood that an operation described as being performed by an electronic device is controlled by the processor 230 of the electronic device 200, the communication module 340 of the electronic device 300, or the application processor 350 of the electronic device 300.

Referring to FIG. 6, in operation 610, the electronic device may verify communication protocols supported by the electronic device. If the electronic device is powered up, the electronic device may perform operation 610. The electronic device may scan a base station, a small cell, and a Wi-Fi AP, which are in the vicinity of the electronic device, periodically or when a specified event occurs. For example, the communication protocols may include one or more communication protocols associated with an LTE signal within a licensed band and an LTE signal within an unlicensed band and one or more communication protocols associated with an LTE signal within the licensed band and a Wi-Fi signal within the unlicensed band.

In operation 620, the electronic device may obtain data associated with states of communication protocols. The electronic device may obtain data associated with states of channels corresponding to communication protocols verified in operation 610. The electronic device may obtain data associated with a state of the electronic device and/or data associated with a user of the electronic device. The electronic device may obtain the above-described data, periodically or when a specified event (e.g., a user input) occurs.

In operation 630, the electronic device may set an enable bit of each of communication protocols based on at least a part of the data obtained in operation 620. The electronic device may set an enable bit of a communication protocol, in which the obtained data satisfies a specified condition, to "1," and may set an enable bit of a communication protocol, in which the obtained data does not satisfy the specified condition, to "0." An embodiment of operation 630 will be described with reference to FIG. 7 in detail.

In operation 640, the electronic device may select at least one of enabled communication protocols. The electronic device may select at least one of communication protocols having enable bit of "1" based on at least a part of the data obtained in operation 620. An embodiment of operation 640 will be described with reference to FIG. 8 in detail.

In operation 650, the electronic device may perform communication using the selected communication protocol. The electronic device may control elements included in the electronic device to perform the communication using the selected communication protocol, and may transmit data associated with a relay device that communicates with the electronic device.

Figure 7:
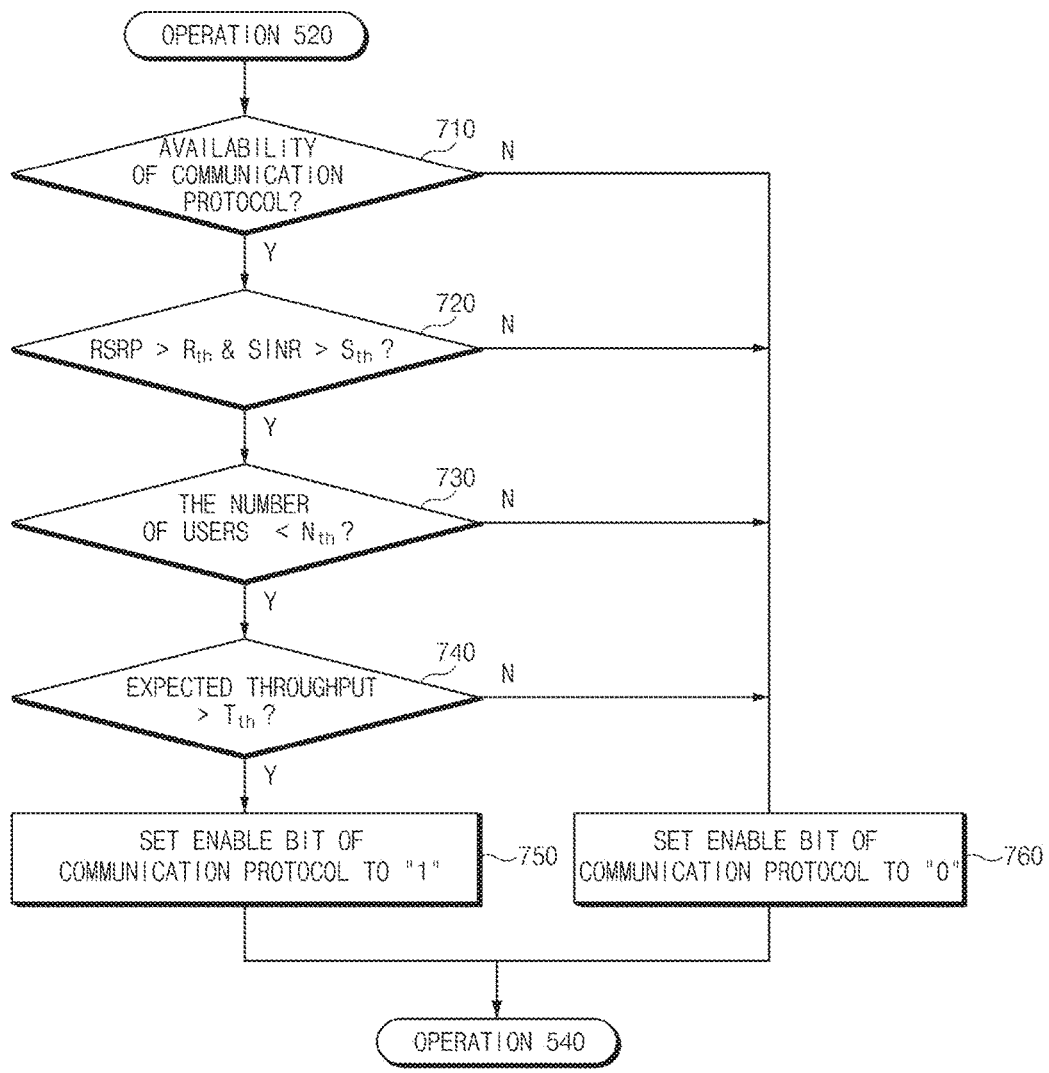
FIG. 7 is a flowchart for describing a communication scheme setting method of an electronic device according to an embodiment of the present disclosure.

FIG. 7 is a flowchart for describing a communication scheme setting method of an electronic device according to an embodiment of the present disclosure.

Hereinafter, it is assumed that the electronic device 100 of FIG. 1, the electronic device 200 of FIG. 2, or the electronic device 300 of FIG. 3 performs a process of FIG. 7. In addition, in details of FIG. 7, it is understood that an operation described as being performed by an electronic device is controlled by the processor 230 of the electronic device 200, the communication module 340 of the electronic device 300, or the application processor 350 of the electronic device 300.

According to an embodiment, if data associated with a state of one channel of channels satisfies one or more specified conditions, the electronic device may determine a communication protocol corresponding to the one channel as an available communication protocol. The electronic device may determine the available communication protocol by performing operations 710, 720, 730, 740, 750, and 760 illustrated in FIG. 7. The electronic device may repeatedly perform operations 710, 720, 730, 740, 750, and 760 on a plurality of communication protocols and may set an enable bit of each of a plurality of communication protocols.

Referring to FIG. 7, in operation 710, the electronic device may determine an availability of the communication protocol. For example, the electronic device may determine the availability of the communication protocol based on information stored in an SIM card and PLMN of a currently connected network provider. For another example, the electronic device may determine an availability of LTE-U or LAA at a current location of the electronic device using GPS and CP positioning. For another example, the electronic device may transmit a UE capability, in which a band of LTE-U is specified, to a base station, and may add an SCell of LTE-U by RRC reconfiguration. When the base station adds the SCell of LTE-U, the electronic device may determine whether the electronic device is at a location where LTE-U is supported.

If it is determined that the communication protocol is available, in operation 720, the electronic device may determine whether RSRP and SINR of a channel corresponding to the communication protocol are greater than specified values (e.g., $R_{th}$ and $S_{th}$) (RSRP>$R_{th}$ and SINR>$S_{th}$). The electronic device may determine an enable bit based on RSRP, SINR, and the like to select a channel, the quality of which is good.

In the case where RSRP and SINR are greater than the specified values, in operation 730, the electronic device may determine whether the number of users of the channel corresponding to the communication protocol is less than a specified value ($N_{th}$). The electronic device may determine the enable bit based on the number of users of the channel to select a non-congested channel.

In the case where the number of users is less than the specified value, in operation 740, the electronic device may determine whether expected throughput of a channel corresponding to the communication protocol is greater than a specified value ($T_{th}$). For example, electronic device may calculate the expected throughput depending on a throughput estimating method described with reference to FIG. 3. For another example, the electronic device may calculate the expected throughput based on RSRP, SINR, CQI, a rank indicator (RI), whether multiple input multiple output (MIMO) is supported, an available bandwidth, the number of supportable SCells, and the like. The electronic device may determine the enable bit based on the expected throughput to select a channel, the quality of which is good.

In the case where the expected throughput is greater than the specified value, in operation 750, the electronic device may set the enable bit of the communication protocol to "1." The electronic device may enable the corresponding communication protocol by setting the enable bit to "1."

In the case where at least one condition is not satisfied in operations 710, 720, 730, and 740, in operation 760, the electronic device may set the enable bit of the communication protocol to "0." The electronic device may disable the corresponding communication protocol by setting the enable bit to "0."

By performing operations 710, 720, 730, 740, 750, and 760, one communication protocol may be enabled or a plurality of communication protocols may be enabled. In the case where enable bits of all communication protocols are set to "0," the electronic device may disable all the communication protocols, or the electronic device may perform operations 710, 720, 730, 740, 750, and 760 after changing the specified value.

The electronic device is illustrated in FIG. 7 as determining the enable bit of the communication protocol by performing operations 710, 720, 730, and 740. However, embodiments are not limited thereto. For example, the electronic device may skip a part of operations 710, 720, 730, and 740 or may perform an additional operation using the above-described other data that is capable of being obtained by the electronic device.

Figure 8:
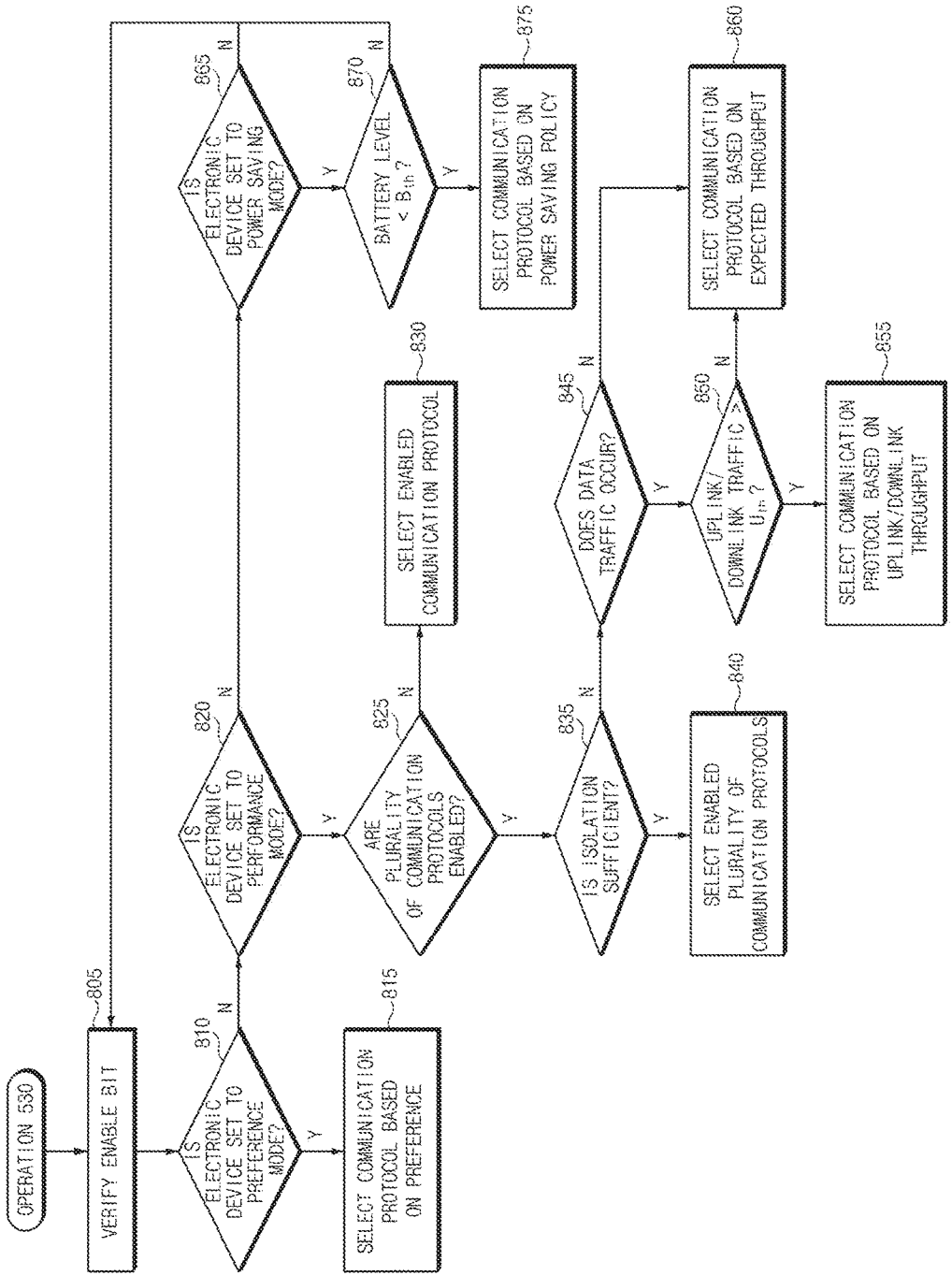
FIG. 8 is a flowchart for describing a communication scheme setting method of an electronic device according to an embodiment of the present disclosure.

FIG. 8 is a flowchart for describing a communication scheme setting method of an electronic device according to an embodiment of the present disclosure.

Hereinafter, it is assumed that the electronic device 100 of FIG. 1, the electronic device 200 of FIG. 2, or the electronic device 300 of FIG. 3 performs a process of FIG. 8. In addition, in details of FIG. 8, it is understood that an operation described as being performed by an electronic device is controlled by the processor 230 of the electronic device 200, the communication module 340 of the electronic device 300, or the application processor 350 of the electronic device 300.

According to an embodiment, the electronic device may select at least a part of available communication protocols (or enabled communication protocols) that is determined depending on operations 710, 720, 730, 740, 750, and 760. The electronic device may select at least one communication protocol by performing operations 805, 810, 815, 820, 825, 830, 835, 840, 845, 850, 855, 860, 865, 870, and 875 illustrated in FIG. 8 and may perform communication using the selected communication protocol.

Referring to FIG. 8, in operation 805, the electronic device may verify an enable bit of a communication protocol. For example, the electronic device may perform operations 810, 815, 820, 825, 830, 835, 840, 845, 850, 855, 860, 865, 870, and 875 on a communication protocol, the enable bit of which is set to "1."

In operation 810, the electronic device may determine whether the mode of the electronic device is set to a preference mode. For example, the preference mode may be a mode in which the electronic device selects at least one communication protocol of two or more communication protocols based on the preference of a user of the electronic device.

If being set to the preference mode, in operation 815, the electronic device may select the communication protocol based on the preference. For example, the electronic device may select the communication protocol, the preference of the user of which is the highest, of enabled communication protocols.

If not being set to the preference mode, in operation 820, the electronic device may determine whether the mode of the electronic device is set to a performance mode. For example, the performance mode may be a mode in which the electronic device selects at least one communication protocol of two or more communication protocols based on the performance of channels corresponding to two or more available communication protocols.

If being set to the performance mode, in operation 825, the electronic device may determine whether a plurality of communication protocols are enabled. For example, the electronic device may verify the number of communication protocols, the enable bit each of which is set to "1."

In the case where one communication protocol is enabled, in operation 830, the electronic device may select the enabled communication protocol. For example, in the case where the enabled communication protocol is one, the electronic device may perform communication using the corresponding communication protocol.

In the case where a plurality of communication protocols are enabled, in operation 835, the electronic device may determine whether isolation is sufficient. For example, the electronic device may determine whether the isolation between frequency bands that enabled communication protocols use is sufficient. For another example, the electronic device may determine whether the isolation of an antenna element that enabled communication protocols use is sufficient. For example, in the case where a first antenna element and a second antenna element are disposed at an upper end or a lower end of the electronic device, if a difference between the center frequency of a frequency band that the first communication protocol uses and the center frequency of a frequency band that the second communication protocol uses is not less than 80 MHz, the electronic device may determine whether the isolation is sufficient. For example, in the case where the first antenna element is disposed at the upper end of the electronic device and the second antenna element is disposed at the lower end of the electronic device, if the difference between the center frequency of a frequency band used by the first communication protocol and the center frequency of a frequency band used by the second communication protocol is not less than 60 MHz, the electronic device may determine whether the isolation is sufficient. For another example, the electronic device may determine whether isolation is sufficient depending on the degree of in device coexistence.

In the case where the isolation is sufficient, in operation 840, the electronic device may select the enabled plurality of communication protocols. For example, the electronic device may perform communication by simultaneously using a plurality of communication protocols. For example, the electronic device may aggregate an LTE signal within a licensed band and an LTE signal and a Wi-Fi signal within an unlicensed band.

In the case where the isolation is not sufficient, in operation 845, the electronic device may determine whether there is data traffic. For example, the electronic device may verify traffic currently occurring in the electronic device.

In the case where the data traffic is present, in operation 850, the electronic device may determine whether a ratio of uplink traffic to downlink traffic is greater than a specified value $U_{th}$. For example, the electronic device may calculate uplink traffic/downlink traffic.

In the case where the ratio of uplink traffic to downlink traffic is greater than a specified value, in operation 855, the electronic device may select a communication protocol based on uplink throughput and downlink throughput. For example, the electronic device may select at least one communication protocol of two or more communication protocols based on the ratio of uplink traffic to downlink traffic. In the case where the uplink traffic is high, the electronic device may select a communication protocol, uplink throughput of which is high.

In the case where there is no data traffic or in the case where the ratio of uplink traffic to downlink traffic is less than a specified value, in operation 860, the electronic device may select a communication protocol based on expected throughput. For example, the electronic device may select the communication protocol based on the expected throughput calculated in operation 850. Alternatively, after calculating the expected throughput in the same manner as that in operation 850, the electronic device may select a communication protocol based on the calculated expected throughput.

If not being set to the performance mode, in operation 865, the electronic device may determine whether the mode of the electronic device is set to a power saving mode. For example, the power saving mode may be a mode in which the electronic device selects a communication protocol, which consumes less power, of two or more communication protocols.

If being set to the power saving mode, in operation 870, the electronic device may determine whether a battery level is less than a specified value $B_{th}$ (e.g., 30%). For example, the electronic device may verify a battery level such that at least one communication protocol of two or more communication protocols is selected based on the battery level of the electronic device.

In the case where the battery level is less than the specified value, in operation 875, the electronic device may select a communication protocol based on a power saving policy. For example, the electronic device may select a communication protocol, which has the lowest power consumption, of enabled communication protocols.

If not being set to the power saving mode or if a battery level is greater than a specified value, the electronic device may perform the operations illustrated in FIG. 8 again after changing critical values.

The electronic device is illustrated in FIG. 8 as selecting a communication protocol by performing operations 805, 810, 815, 820, 825, 830, 835, 840, 845, 850, 855, 860, 865, 870, and 875. However, embodiments are not limited thereto. For example, the electronic device may skip a part of operations 805, 810, 815, 820, 825, 830, 835, 840, 845, 850, 855, 860, 865, 870, and 875 or may perform an additional operation using the above-described other data that is capable of being obtained by the electronic device.

Figure 9:
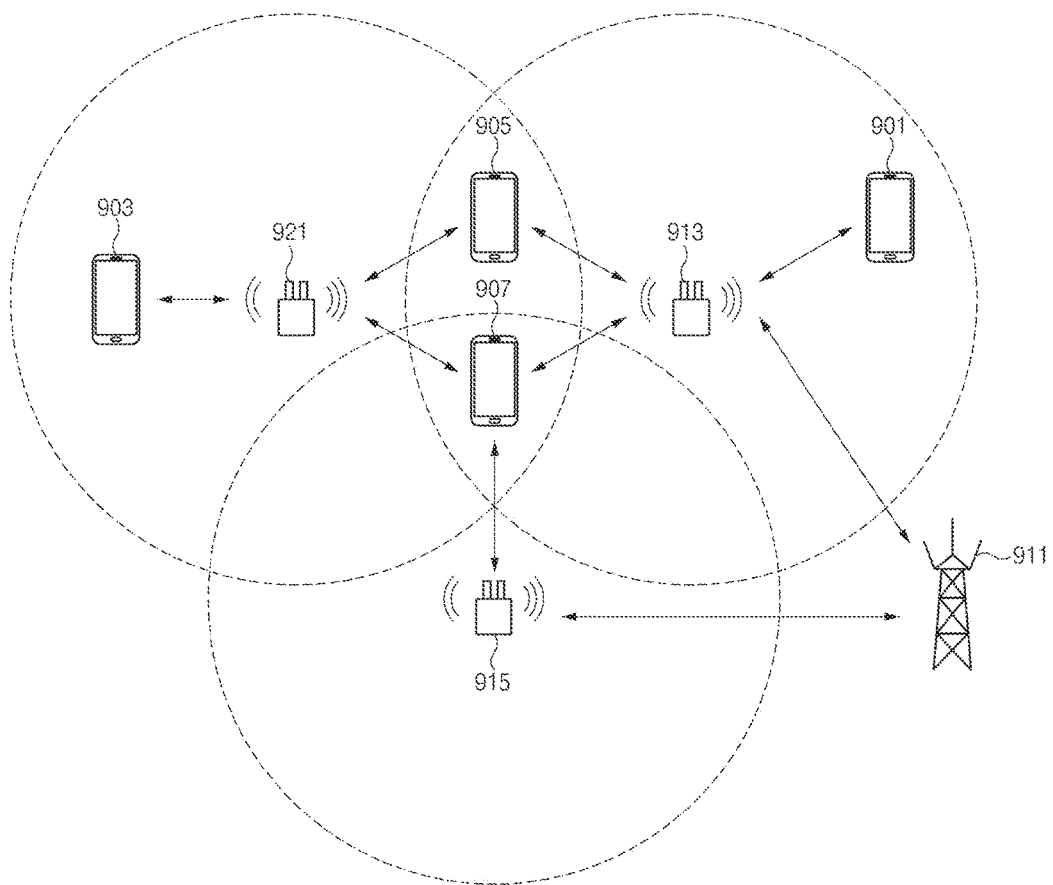
FIG. 9 is a view for describing an example operation of an electronic device according to an embodiment of the present disclosure.

FIG. 9 is a view for describing an example operation of an electronic device according to an embodiment of the present disclosure.

Referring to FIG. 9, an electronic device 901 may communicate with a small cell 913 connected with a base station 911. In this case, a communication protocol enabled by the electronic device 901 may be an LAA and/or LTE-U. For example, the electronic device 901 may communicate with the small cell 913 depending on a communication protocol supported by the electronic device 901 or a communication protocol supported by the small cell 913 of LAA or LTE-U. For another example, the electronic device 901 may communicate with the small cell 913 depending on a communication protocol, the performance of which is good, of LAA or LTE-U. For another example, the electronic device 901 may communicate with the small cell 913 depending on the communication protocol selected by the operation illustrated in FIG. 7 or FIG. 8.

An electronic device 903 may communicate with a Wi-Fi AP 921. In this case, the communication protocol enabled by the electronic device 903 may be LWA, LWIP, MPTCP, or smart bonding. For example, in the case where the Wi-Fi AP 921 supports LWA (e.g., in the case where the Wi-Fi AP 921 is connected with the base station 911 or another base station), the electronic device 903 may communicate with the Wi-Fi AP 921 depending on LWA. For another example, in the case where the Wi-Fi AP 921 is connected with an MPTCP proxy server, the electronic device 903 may communicate with the Wi-Fi AP 921 depending on MPTCP. For another example, in the case where the Wi-Fi AP 921 is not connected with a base station or an MPTCP proxy server, the electronic device 903 may communicate with the Wi-Fi AP 921 depending on smart bonding.

An electronic device 905 may communicate with the small cell 913 and the Wi-Fi AP 921. For example, in the case where a distance from the small cell 913 is sufficiently close and the channel quality is good, since frequency utility of LAA or LTE-U is higher than that of Wi-Fi in a band of 5 GHz, the electronic device 905 may communicate with the small cell 913 in LAA or LTE-U scheme.

For another example, in the case where the electronic device 905 supports LAA or LTE-U and smart bonding, the electronic device 905 may bond a Wi-Fi signal including a band of 2.4 GHz together with LAA or LTE-U including the band of 5 GHz.

For another example, in the case where the isolation between the unlicensed band of LAA or LTE-U and a frequency band of Wi-Fi are sufficient, the electronic device 905 may use LWA or MPTCP together with LAA or LTE-U. Since MPTCP supports the band of 2.4 GHz, the electronic device may use MPTCP in a band of 2.4 GHz together with LAA or LTE-U even though the isolation is not sufficient.

For another example, in the case where expected throughput of LAA or LTE-U is lower than expected throughput of LWA, MPTCP, or smart bonding, the electronic device 905 may report CQI of "0" to the small cell 913 and may use LWA, MPTCP, or smart bonding.

An electronic device 907 may communicate with the small cell 913, a small cell 915, and the Wi-Fi AP 921. For example, the electronic device 907 may use a small cell, the channel environment of which is good, of the small cell 913 and the small cell 915 as an SCell of LAA or LTE-U. The electronic device 907 may communicate with the selected small cell depending on LAA or LTE-U. For another example, in the case where the isolation between the unlicensed band of LAA or LTE-U and a frequency band of Wi-Fi are insufficient, the electronic device 907 may use LWA or MPTCP using the Wi-Fi AP 921 and the small cell, the channel environment of which is good, of the small cell 913 and the small cell 915 together with LAA or LTE-U.

Figure 10:
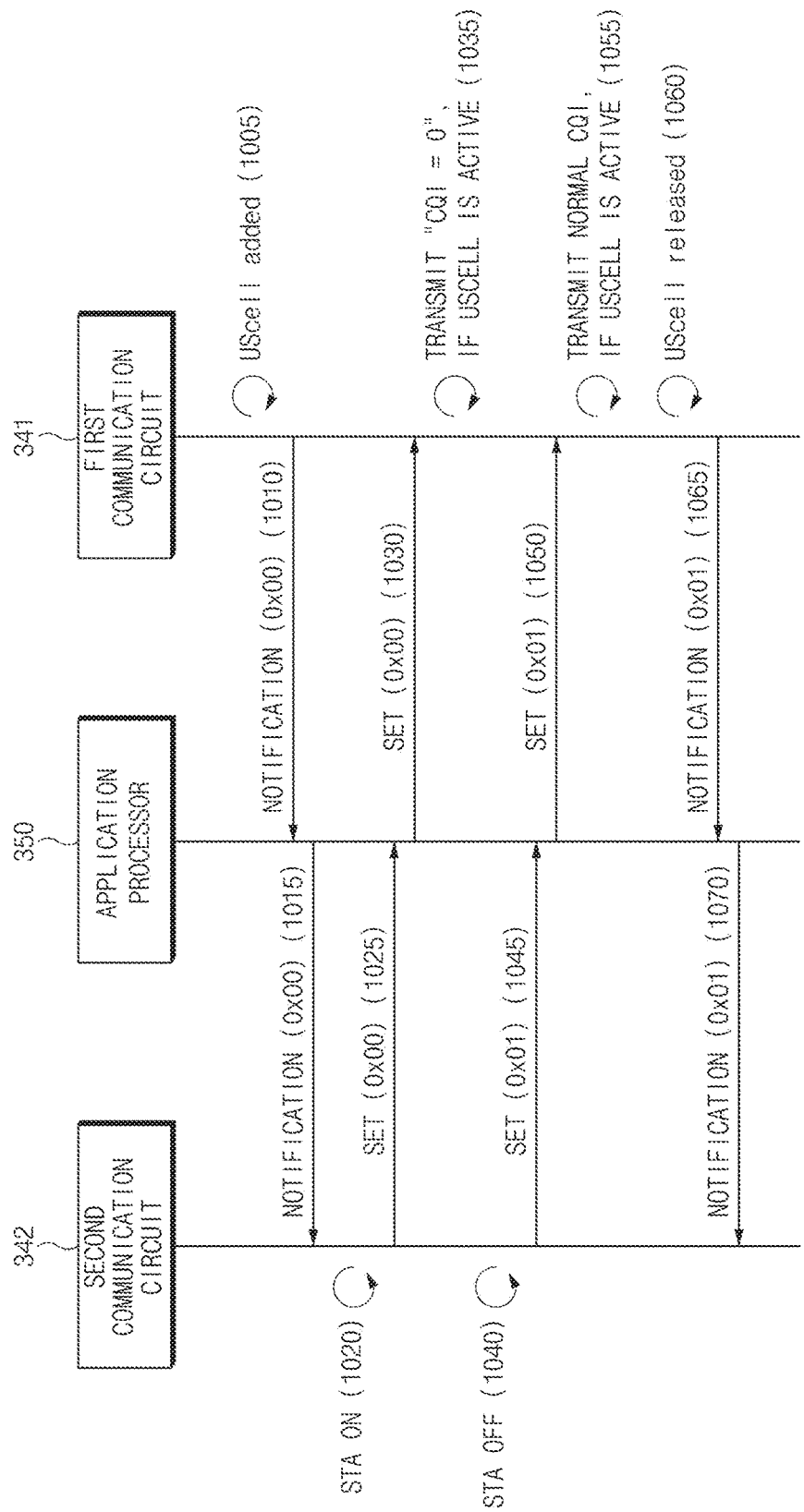
FIG. 10 is a flowchart for describing a communication scheme setting method of an electronic device according to an embodiment of the present disclosure.

FIG. 10 is a flowchart for describing a communication scheme setting method of an electronic device according to an embodiment of the present disclosure.

Hereinafter, it is assumed that the electronic device 300 of FIG. 3 performs a process of FIG. 10. In addition, as described in FIG. 10, it is understood that the operation described as being executed by an electronic device is controlled by the communication module 340 or the application processor 350 of the electronic device 300.

According to an embodiment, the electronic device may select a communication protocol to be used depending on whether the first communication circuit 341 and the second communication circuit 342 are active. For example, the first communication circuit 341 and the second communication circuit 342 may be connected through the application processor 350 and may operate such that one of the first communication circuit 341 and the second communication circuit 342 is selectively activated.

Figure 11:
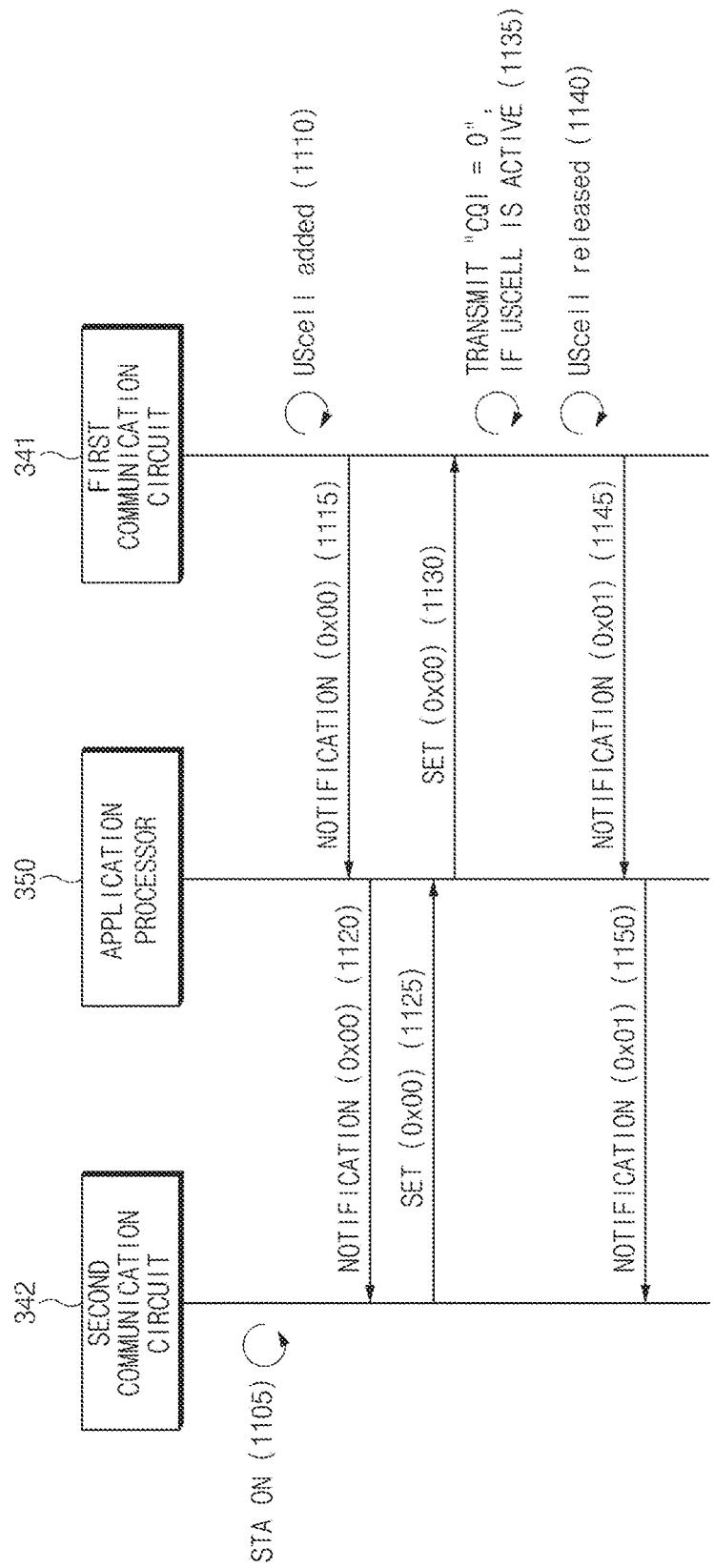
FIG. 11 is a flowchart for describing a communication scheme setting method of an electronic device according to an embodiment of the present disclosure.

The format of NOTIFICATION described with reference to FIGS. 10 and 11 is described in Table 1.

TABLE 1

| Field | Length (bytes) | Description |
|---|---|---|
| SUB_CMD | 1 | Sub-command code (0x4F) |
| CMD_TYPE | 1 | NOTIFICATION (0x03) |
| STATE | 1 | 0x00: At least one Unlicensed Scell is added<br>0x01: All Unlicensed Scell(s) are released<br>0x02~0xFF: Reserved |

The format of SET described with reference to FIGS. 10 and 11 is described in Table 2.

TABLE 2

| Field | Length (bytes) | Description |
| --- | --- | --- |
| SUB_CMD | 1 | Sub-command code (0x4F) |
| CMD_TYPE | 1 | SET (0x03) |
| STATE | 1 | 0x00: Inactive (Enable Unlicensed LTE operation)<br>0x01: Active (Disable Unlicensed LTE operation)<br>0x02~0xFF: Reserved |

Referring to FIG. 10, in operation 1005, the first communication circuit 341 may add an unlicensed Scell (UScell). For example, the first communication circuit 341 may be connected with the UScell to perform communication using LTE-U.

In operation 1010, the first communication circuit 341 may transmit NOTIFICATION (0x00) to the application processor 350 in response to the adding of the UScell. For example, if the UScell is added, the first communication circuit 341 may transmit NOTIFICATION (0x00) for providing notification that the UScell is added, to the application processor 350.

In operation 1015, the application processor 350 may transmit NOTIFICATION (0x00) to the second communication circuit 342. For example, the application processor 350 may perform a function to transmit NOTIFICATION (0x00) to the second communication circuit 342.

In operation 1020, the state of the second communication circuit 342 may be changed to "STA ON" state. For example, the second communication circuit 342 may be connected with a Wi-Fi AP. If the Wi-Fi AP is connected, the second communication circuit 342 is active. "STA ON" state and "STA OFF" state may be applied to only Wi-Fi of 2.4 GHz or may be applied to Wi-Fi of 2.4 GHz and 5 GHz. In addition, "STA ON" state and "STA OFF" state may be applied to a P2P mode of Wi-Fi and a mobile hot spot mode.

In operation 1025, if being changed to "STA ON" state in a state where NOTIFICATION (0x00) is received, the second communication circuit 342 may transmit SET (0x00) to the application processor 350. For example, the second communication circuit 342 may transmit SET (0x00) for disabling an operation of the first communication circuit 341 to the application processor 350.

In operation 1030, the application processor 350 may transmit SET (0x00) to the first communication circuit 341. For example, the application processor 350 may perform a function to transmit SET (0x00) to the first communication circuit 341.

In operation 1035, if the UScell is active, the first communication circuit 341 may transmit "CQI=0" in response to the receiving of SET (0x00). For example, in the case where Wi-Fi is active and the UScell is added, the first communication circuit 341 may report a CQI report of "0" to a small cell connected with the electronic device such that the electronic device communicates using Wi-Fi. The first communication circuit 341 may allow a base station not to assign a resource to an LTE-U Scell based on a predefined message.

In operation 1040, the state of the second communication circuit 342 may be changed to "STA OFF" state. For example, the second communication circuit 342 may be disconnected from the Wi-Fi AP. If being disconnected from the Wi-Fi AP, the second communication circuit 342 may be inactive.

In operation 1045, the second communication circuit 342 may transmit SET (0x01) to the application processor 350 in response to "STA OFF." For example, the second communication circuit 342 may transmit SET (0x01) for enabling the operation of the first communication circuit 341 to the application processor 350.

In operation 1050, the application processor 350 may transmit SET (0x01) to the first communication circuit 341. For example, the application processor 350 may perform a function to transmit SET (0x01) to the first communication circuit 341.

In operation 1055, if the UScell is added, the first communication circuit 341 may transmit normal CQI in response to the receiving of SET (0x01). For example, in the case where Wi-Fi is inactive and the UScell is added, the first communication circuit 341 may report the CQI report of a value greater than "0" to a small cell connected with the electronic device such that the electronic device communicates within the unlicensed band using LTE.

In operation 1060, the first communication circuit 341 may release the UScell. For example, in the case where the first communication circuit 341 is out of coverage of the UScell, the first communication circuit 341 may release the UScell.

In operation 1065, the first communication circuit 341 may transmit NOTIFICATION (0x01) to the application processor 350 in response to the releasing of the US cell. For example, if the US cell is released, the first communication circuit 341 may transmit NOTIFICATION (0x01) for providing a notification that the UScell is released, to the application processor 350.

In operation 1070, the application processor 350 may transmit NOTIFICATION (0x01) to the second communication circuit 342. For example, the application processor 350 may perform a function to transmit NOTIFICATION (0x01) to the second communication circuit 342. If NOTIFICATION (0x01) is transmitted, the second communication circuit 342 may not perform an additional operation associated with the above-described operations 1005, 1010, 1015, 1020, 1025, 1030, 1035, 1040, 1045, 1050, 1055, 1060, 1065, and 1070.

FIG. 11 is a flowchart for describing a communication scheme setting method of an electronic device according to an embodiment of the present disclosure.

Hereinafter, it is assumed that the electronic device 100 of FIG. 1, the electronic device 200 of FIG. 2, or the electronic device 300 of FIG. 3 performs a process of FIG. 11. In addition, in details of FIG. 11, it is understood that an operation described as being performed by an electronic device is controlled by the processor 230 of the electronic device 200, the communication module 340 of the electronic device 300, or the application processor 350. For convenience of description, a description duplicated with an operation described with reference to FIG. 10 will not be repeated here.

According to an embodiment, the electronic device may select a communication protocol to be used depending on whether the first communication circuit 341 and the second communication circuit 342 are active. For example, the first communication circuit 341 and the second communication circuit 342 may be connected through the application processor 350 and may operate such that one of the first communication circuit 341 and the second communication circuit 342 is selectively activated.

Referring to FIG. 11, in operation 1105, the state of the second communication circuit 342 may be changed to "STA ON" state.

In operation 1110, the first communication circuit 341 may add a UScell.

In operation 1115, the first communication circuit 341 may transmit NOTIFICATION (0x00) to the application processor 350.

In operation 1120, the application processor 350 may transmit NOTIFICATION (0x00) to the second communication circuit 342.

In operation 1125, the second communication circuit 342 may transmit SET (0x00) to the application processor 350. For example, since the second communication circuit 342 is in a state where the second communication circuit 342 is connected with a Wi-Fi AP, the second communication circuit 342 may transmit SET (0x00) to the application processor 350 immediately in response to the receiving of NOTIFICATION (0x00).

In operation 1130, the application processor 350 may transmit SET (0x00) to the first communication circuit 341.

In operation 1135, if the UScell is active, the first communication circuit 341 may transmit "CQI=0."

In operation 1140, the first communication circuit 341 may release the UScell.

In operation 1145, the first communication circuit 341 may transmit NOTIFICATION (0x01) to the application processor 350.

In operation 1150, the application processor 350 may transmit NOTIFICATION (0x01) to the second communication circuit 342.

According to an embodiment, an electronic device may include one or more antennas that resonate within a licensed band and an unlicensed band, a first communication circuit electrically connected with at least part of the one or more antennas and processing an LTE signal, a second communication circuit electrically connected with at least part of the one or more antennas and processing a Wi-Fi signal, and a processor electrically connected with the first communication circuit and the second communication circuit. The processor may be configured to obtain first data indicating a state of a first channel corresponding to a first communication protocol associated with a first LTE signal within the licensed band and a second LTE signal within the unlicensed band, obtain second data indicating a state of a second channel corresponding to a second communication protocol associated with the first LTE signal within the licensed band and the Wi-Fi signal within the unlicensed band, select at least one communication protocol of the first communication protocol or the second communication protocol based on the first data and the second data, and perform communication through a communication circuit, which corresponds to the selected at least one communication protocol, of the first communication circuit and the second communication circuit using the selected at least one communication protocol.

According to an embodiment, the first communication protocol includes one or more communication protocols of licensed-assisted access (LAA) using LTE or LTE-unlicensed (LTE-U), and the processor is further configured to determine whether isolation between the licensed band and the unlicensed band is sufficient, and if isolation between the licensed band and the unlicensed band is determined to be sufficient, aggregate the first LTE signal within the licensed band and the second LTE signal and the Wi-Fi signal within the unlicensed band.

According to an embodiment, an electronic device may include a first communication interface configured to support a licensed band and an unlicensed band, a second communication interface configured to support the unlicensed band without supporting the licensed band, and a processor. The processor may be configured to verify a first communication protocol available by the first communication interface or the second communication interface, verify a second communication protocol available by a communication network connected with a corresponding communication interface of the first communication interface or the second communication interface, verify first attribute information associated with a first channel corresponding to the first communication protocol, verify second attribute information associated with a second channel corresponding to the second communication protocol, and determine a protocol, which is to be active with respect to the unlicensed band, of the first communication protocol or the second communication protocol based on the first attribute information and the second attribute information.

According to an embodiment, an electronic device may include one or more antenna elements configured to resonate within a licensed band and an unlicensed band and at least one processor including a first communication circuit electrically connected with at least part of the one or more antennas elements and processing an LTE signal and a second communication circuit electrically connected with at least part of the one or more antennas elements and processing a Wi-Fi signal. The at least one processor may be configured to perform communication depending on one or more communication protocols associated with an LTE signal within the licensed band and an LTE signal within the unlicensed band and one or more communication protocols associated with an LTE signal within the licensed band and a Wi-Fi signal within the unlicensed band, obtain data associated with states of channels corresponding to the communication protocols, select at least one communication protocol of the communication protocols based on the data associated with the states of the channels, and perform communication using the at least one communication protocol.

According to an embodiment, a method may include obtaining first data indicating a state of a first channel corresponding to a first communication protocol associated with a first LTE signal within a licensed band and a second LTE signal within an unlicensed band and second data indicating a state of a second channel corresponding to a second communication protocol associated with the first LTE signal within the licensed band and a Wi-Fi signal within the unlicensed band, selecting at least one communication protocol of the first communication protocol or the second communication protocol based at least on the first data and the second data, and performing communication through a corresponding communication circuit of first communication circuit and second communication circuit using the selected at least one communication protocol.

According to an embodiment, a computer-readable recording medium may store thereon an instruction, when executed by at least one processor included in an electronic device, performing a method including obtaining first data indicating a state of a first channel corresponding to a first communication protocol associated with a first LTE signal within a licensed band and a second LTE signal within a unlicensed band and second data indicating a state of a second channel corresponding to a second communication protocol associated with the first LTE signal within the licensed band and a Wi-Fi signal within the unlicensed band, selecting at least one communication protocol of the first communication protocol or the second communication protocol based at least on the first data and the second data, and performing communication through a corresponding communication circuit of first communication circuit and second communication circuit using the selected at least one communication protocol.

The term "module" used in this disclosure may represent, for example, a unit including one or more combinations of hardware, software and firmware. The term "module" may be interchangeably used with the terms "unit," "logic," "logical block," "component," and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. The computer-readable storage media, for example, may be a memory.

A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   one or more antennas configured to resonate within a licensed band and an unlicensed band;
   a first communication circuit electrically connected with a first number of the one or more antennas and configured to process a long-term evolution (LTE) signal;
   a second communication circuit electrically connected with a second number of the one or more antennas and configured to process a Wi-Fi signal; and
   a processor electrically connected with the first communication circuit and the second communication circuit,
   wherein the processor is configured to:
      obtain first data indicating a state of a first channel corresponding to a first communication protocol associated with a first LTE signal within the licensed band and a second LTE signal within the unlicensed band,
      obtain second data indicating a state of a second channel corresponding to a second communication protocol associated with the first LTE signal within the licensed band and the Wi-Fi signal within the unlicensed band,
      select at least one of the first communication protocol or the second communication protocol based on the first data and the second data, and
      perform communication using the selected at least one of the first communication protocol or the second communication protocol through at least one of the first communication circuit or the second communication circuit,
   wherein if the first communication protocol is selected, the processor is configured to aggregate the first LTE signal and the second LTE signal processed by the first communication circuit, and
   wherein if the second communication protocol is selected, the processor is configured to aggregate the first LTE signal processed by the first communication circuit and the Wi-Fi signal processed by the second communication circuit.

2. The electronic device of claim 1, wherein the first communication protocol includes one of communication protocols of licensed-assisted access (LAA) using LTE or LTE-unlicensed (LTE-U).

3. The electronic device of claim 1, wherein the second communication protocol includes one of communication protocols of LTE-Wi-Fi aggregation (LWA), LTE wireless local area network (WLAN) integration with Internet protocol security tunnel (LWIP), multipath transmission control protocol (TCP) (MPTCP), or smart bonding.

4. The electronic device of claim 1, wherein each of the first data and the second data includes data associated with at least one of received signal strength indication (RSSI), a reference signal received power (RSRP), a reference signal received quality (RSRQ), a signal to interference plus noise ratio (SINR), an available bandwidth, a distance from a relay device, a band that the relay device supports, an RSSI of the relay device, a SINR of the relay device, a number of available relay devices, an activation condition of a communication protocol, or traffic.

5. The electronic device of claim 1, wherein the processor is further configured to:
   obtain third data indicating a state of the electronic device, and
   select the at least one of the first communication protocol or the second communication protocol further based on the third data.

6. The electronic device of claim 5, wherein the third data includes data associated with at least one of a communication protocol supported by the electronic device, a moving speed of the electronic device, whether handover is supported, a battery level, a hot spot provided by the electronic device, or a ratio of uplink traffic to downlink traffic.

7. The electronic device of claim 1, wherein the processor is further configured to:
   obtain third data associated with a user of the electronic device, and select the at least one of the first communication protocol or the second communication protocol further based on the third data.

8. The electronic device of claim 1, wherein the processor is further configured to:
   if at least part of the first data and the second data satisfies a specified condition, determine the at least one of the first communication protocol or the second communication protocol corresponding to the at least part of the first data and the second data as an available communication protocol.

9. The electronic device of claim 1, wherein the processor is further configured to:
   obtain the first data, the second data, third data indicating a state of the electronic device, and fourth data associated with a user of the electronic device, and
   verify one or more available communication protocols of the first communication protocol and the second communication protocol based on the first data and the second data,
   wherein, to select the at least one of the first communication protocol or the second communication protocol, the processor is further configured to select at least one of the one or more available communication protocols based on at least one of the third data, or the fourth data.

10. The electronic device of claim 9, wherein the processor is further configured to:
    select the at least one of the one or more available communication protocols is further based on data indicating a ratio of uplink traffic to downlink traffic included in the third data.

11. The electronic device of claim 1, wherein the processor is further configured to:
    determine a channel quality indicator (CQI) to be transmitted to a relay device transmitting an LTE signal, which corresponds to the selected at least one of the first communication protocol or the second communication protocol, of the first LTE signal or the second LTE signal based on the selected at least one of the first communication protocol or the second communication protocol.

12. An electronic device comprising:
    a first communication interface configured to support a licensed band and an unlicensed band;
    a second communication interface configured to support the unlicensed band without supporting the licensed band; and
    a processor,
    wherein the processor is configured to:
       verify a first communication protocol available by the first communication interface or the second communication interface,
       verify a second communication protocol available by a communication network connected with a corresponding communication interface of the first communication interface or the second communication interface,
       verify first attribute information associated with a first channel corresponding to the first communication protocol,
       verify second attribute information associated with a second channel corresponding to the second communication protocol, and
       determine a protocol, which is to be active with respect to the unlicensed band, of the first communication protocol or the second communication protocol based on the first attribute information and the second attribute information,
    wherein if the first communication protocol is selected, the processor is configured to aggregate the first LTE signal and the second LTE signal processed by the first communication circuit, and
    wherein if the second communication protocol is selected, the processor is configured to aggregate the first LTE signal processed by the first communication circuit and the Wi-Fi signal processed by the second communication circuit.

13. The electronic device of claim 12, wherein the processor is further configured to:
    if the first communication protocol is active, control the unlicensed band using the first communication interface, and
    if the second communication protocol is active, control the unlicensed band using the second communication interface.

14. The electronic device of claim 12,
    wherein the unlicensed band includes a first frequency band and a second frequency band, and
    wherein the processor is further configured to:
       control the first frequency band using the first communication interface, and
       control the second frequency band using the second communication interface.

15. The electronic device of claim 12, wherein the processor is further configured to:
    verify third attribute information associated with the electronic device, and
    determine the protocol, which is to be active with respect to the unlicensed band, of the first communication protocol or the second communication protocol further based on the third attribute information.

16. The electronic device of claim 15,
    wherein each of the first attribute information and the second attribute information includes data associated with at least one of received signal strength indication (RSSI), a reference signal received power (RSRP), reference signal received quality (RSRQ), a signal to interference plus noise ratio (SINR), an available bandwidth, a distance from a relay device, a band supported by the relay device, an RSSI of the relay device, a SINR of the relay device, a number of available relay devices, an activation condition of a communication protocol, or traffic, and
    wherein the third attribute information includes data associated with at least one of a communication protocol supported by the electronic device, a moving speed of the electronic device, whether handover is supported, a battery level, a hot spot provided by the electronic device, or a ratio of uplink traffic to downlink traffic.

17. The electronic device of claim 12, wherein the processor is further configured to:
    verify third attribute information associated with states of a first network connected through the first channel and a second network connected through the second channel, and
    determine the protocol, which is to be active with respect to the unlicensed band, of the first communication protocol or the second communication protocol further based on the third attribute information.

18. The electronic device of claim 12, further comprising:
a memory in which a plurality of applications are stored,
wherein the processor is further configured to:
- verify quality information associated with each of the plurality of applications, and
- determine the protocol, which is to be active with respect to the unlicensed band, of the first communication protocol or the second communication protocol further based on the quality information.

19. The electronic device of claim 12, wherein the processor is further configured to:
- updated the protocol, which is to be active with respect to the unlicensed band, of the first communication protocol or the second communication protocol periodically or if a specified event occurs.

* * * * *